US012521246B2

(12) United States Patent
Neichel et al.

(10) Patent No.: US 12,521,246 B2
(45) Date of Patent: Jan. 13, 2026

(54) BONE GRAFT SHAPER AND PATIENT SPECIFIC BONE GRAFT

(71) Applicant: TORNIER SAS, Montbonnot-Saint Martin (FR)

(72) Inventors: Nicolas Neichel, Le Sappey en Chartreuse (FR); Matthieu Jean Marie Vennin, Grenoble (FR); Cedric Leon, Saint-Ismier (FR); Gilles Walch, Lyons (FR); Pierric Deransart, Saint Martin d'uriage (FR); Pascal Boileau, Nice (FR)

(73) Assignee: TORNIER SAS, Montbonnot-Saint-Martin (FR)

( * ) Notice: Subject to any disclaimer, the term of this patent is extended or adjusted under 35 U.S.C. 154(b) by 246 days.

(21) Appl. No.: 17/643,436

(22) Filed: Dec. 9, 2021

(65) Prior Publication Data

US 2022/0096240 A1 Mar. 31, 2022

Related U.S. Application Data

(62) Division of application No. 15/426,720, filed on Feb. 7, 2017, now abandoned.

(30) Foreign Application Priority Data

Mar. 25, 2016 (EP) .................................. 16305351

(51) Int. Cl.
*A61F 2/30* (2006.01)
*A61F 2/28* (2006.01)
(Continued)

(52) U.S. Cl.
CPC ............ *A61F 2/30734* (2013.01); *A61F 2/28* (2013.01); *A61F 2/30942* (2013.01);
(Continued)

(58) Field of Classification Search
CPC ........ A61F 2/30942; A61F 2002/30957; A61F 2/28; A61F 2/30; A61F 2240/00;
(Continued)

(56) References Cited

U.S. PATENT DOCUMENTS

| | | | |
|---|---|---|---|
| 4,919,670 | A | 4/1990 | Dale et al. |
| 5,030,219 | A | 7/1991 | Matsen, III et al. |

(Continued)

FOREIGN PATENT DOCUMENTS

| | | |
|---|---|---|
| CA | 2927086 | 4/2015 |
| CA | 2927811 | 4/2015 |

(Continued)

OTHER PUBLICATIONS

US 9,451,972 B2, 09/2016, Lang et al. (withdrawn)
(Continued)

*Primary Examiner* — Susan D Leong
*Assistant Examiner* — Vipul Malik
(74) *Attorney, Agent, or Firm* — DUANE MORRIS LLP

(57) ABSTRACT

A bone press includes a base; a compression plate located opposite to the base; a housing that extends between the base and the compression plate, the housing extending along a longitudinal axis of the bone press; a pressing zone within the housing and between the base and the compression plate along the longitudinal axis of the bone press; and an actuator to provide relative movement between the compression plate and the base to create compression in the pressing zone.

15 Claims, 27 Drawing Sheets

(51) Int. Cl.
   *A61F 2/40* (2006.01)
   *A61F 2/46* (2006.01)

(52) U.S. Cl.
   CPC .......... *A61F 2/4059* (2013.01); *A61F 2/4081* (2013.01); *A61F 2/4644* (2013.01); *A61F 2002/2835* (2013.01); *A61F 2002/30736* (2013.01); *A61F 2002/30957* (2013.01); *A61F 2002/4085* (2013.01)

(58) Field of Classification Search
   CPC ....... A61F 2240/001; A61F 2002/3401; B29L 2031/757; B29L 2031/7532; B33Y 80/00; B29C 33/308; B30B 15/026
   See application file for complete search history.

(56) References Cited

U.S. PATENT DOCUMENTS

| | | |
|---|---|---|
| 5,329,846 A | 7/1994 | Bonutti |
| 5,383,938 A | 1/1995 | Rohr et al. |
| 5,458,637 A | 10/1995 | Hayes |
| 5,531,793 A | 7/1996 | Kelman et al. |
| 5,610,966 A | 3/1997 | Martell et al. |
| 5,725,586 A | 3/1998 | Sommerich |
| 5,768,134 A | 6/1998 | Swaelens et al. |
| 5,769,856 A | 6/1998 | Dong et al. |
| 5,779,710 A | 7/1998 | Matsen, III |
| 5,807,437 A | 9/1998 | Sachs et al. |
| 5,824,078 A * | 10/1998 | Nelson .................... B29C 43/16 623/66.1 |
| 5,824,085 A | 10/1998 | Sahay et al. |
| 6,002,859 A | 12/1999 | DiGioia, III et al. |
| 6,129,764 A | 10/2000 | Servidio |
| 6,155,812 A * | 12/2000 | Smith ....................... A61F 2/38 249/55 |
| 6,172,856 B1 | 1/2001 | Jang |
| 6,183,519 B1 | 2/2001 | Bonnin et al. |
| 6,364,910 B1 | 4/2002 | Shultz et al. |
| 6,385,475 B1 | 5/2002 | Cinquin et al. |
| 6,432,142 B1 | 8/2002 | Kamiya et al. |
| 6,459,948 B1 | 10/2002 | Ateshian et al. |
| 6,648,894 B2 | 11/2003 | Abdelgany et al. |
| 6,719,799 B1 | 4/2004 | Kropf |
| 6,772,026 B2 | 8/2004 | Bradbury et al. |
| 6,797,006 B2 | 9/2004 | Hodorek |
| 6,849,223 B2 | 2/2005 | Dean et al. |
| 6,915,150 B2 | 7/2005 | Cinquin et al. |
| 6,944,518 B2 | 9/2005 | Roose |
| 7,175,665 B2 | 2/2007 | German et al. |
| 7,468,075 B2 | 12/2008 | Lang et al. |
| 7,469,474 B2 | 12/2008 | Farrar |
| 7,534,263 B2 | 5/2009 | Burdulis, Jr. et al. |
| 7,599,539 B2 | 10/2009 | Kunz et al. |
| 7,618,451 B2 | 11/2009 | Berez et al. |
| 7,634,119 B2 | 12/2009 | Tsougarakis et al. |
| 7,648,530 B2 | 1/2010 | Habermeyer et al. |
| 7,678,150 B2 | 3/2010 | Tornier et al. |
| 7,702,380 B1 | 4/2010 | Dean |
| 7,717,956 B2 | 5/2010 | Lang |
| 7,747,305 B2 | 6/2010 | Dean et al. |
| 7,796,791 B2 | 9/2010 | Tsougarakis et al. |
| 7,799,077 B2 | 9/2010 | Lang et al. |
| 7,802,503 B2 | 9/2010 | Couvillion et al. |
| 7,822,588 B2 | 10/2010 | Mueller et al. |
| 7,831,079 B2 | 11/2010 | Kunz et al. |
| 7,892,287 B2 | 2/2011 | Deffenbaugh |
| 7,927,338 B2 | 4/2011 | Laffargue et al. |
| 7,981,158 B2 | 7/2011 | Fitz et al. |
| 7,983,777 B2 | 7/2011 | Melton et al. |
| 7,993,408 B2 | 8/2011 | Meridew et al. |
| 8,007,448 B2 | 8/2011 | Barrera |
| 8,014,984 B2 | 9/2011 | Iannotti et al. |
| 8,055,487 B2 | 11/2011 | James |
| 8,062,302 B2 | 11/2011 | Lang et al. |
| 8,066,708 B2 | 11/2011 | Lang et al. |
| 8,077,950 B2 | 12/2011 | Tsougarakis et al. |
| 8,083,745 B2 | 12/2011 | Lang et al. |
| 8,094,900 B2 | 1/2012 | Steines et al. |
| 8,105,330 B2 | 1/2012 | Fitz et al. |
| 8,122,582 B2 | 2/2012 | Burdulis, Jr. et al. |
| 8,234,097 B2 | 7/2012 | Steines et al. |
| 8,337,501 B2 | 12/2012 | Fitz et al. |
| 8,337,503 B2 | 12/2012 | Lian |
| 8,337,507 B2 | 12/2012 | Lang et al. |
| 8,343,218 B2 | 1/2013 | Lang et al. |
| 8,350,186 B2 | 1/2013 | Jones et al. |
| 8,366,771 B2 | 2/2013 | Burdulis, Jr. et al. |
| 8,377,073 B2 | 2/2013 | Wasielewski |
| 8,377,129 B2 | 2/2013 | Fitz et al. |
| 8,439,926 B2 | 5/2013 | Bojarski et al. |
| 8,457,930 B2 | 6/2013 | Schroeder |
| 8,460,304 B2 | 6/2013 | Fitz et al. |
| 8,475,463 B2 | 7/2013 | Lian |
| 8,480,754 B2 | 7/2013 | Bojarski et al. |
| 8,500,740 B2 | 8/2013 | Bojarski et al. |
| 8,529,568 B2 | 9/2013 | Bouadi |
| 8,529,630 B2 | 9/2013 | Bojarski et al. |
| 8,532,806 B1 | 9/2013 | Masson |
| 8,535,319 B2 | 9/2013 | Ball |
| 8,545,509 B2 | 10/2013 | Park et al. |
| 8,545,569 B2 | 10/2013 | Fitz et al. |
| 8,551,099 B2 | 10/2013 | Lang et al. |
| 8,551,102 B2 | 10/2013 | Fitz et al. |
| 8,551,103 B2 | 10/2013 | Fitz et al. |
| 8,551,169 B2 | 10/2013 | Fitz et al. |
| 8,556,906 B2 | 10/2013 | Fitz et al. |
| 8,556,907 B2 | 10/2013 | Fitz et al. |
| 8,556,971 B2 | 10/2013 | Lang |
| 8,556,983 B2 | 10/2013 | Bojarski et al. |
| 8,561,278 B2 | 10/2013 | Fitz et al. |
| 8,562,611 B2 | 10/2013 | Fitz et al. |
| 8,562,618 B2 | 10/2013 | Fitz et al. |
| 8,568,479 B2 | 10/2013 | Fitz et al. |
| 8,568,480 B2 | 10/2013 | Fitz et al. |
| 8,585,708 B2 | 11/2013 | Fitz et al. |
| 8,608,749 B2 | 12/2013 | Meridew et al. |
| 8,617,172 B2 | 12/2013 | Fitz et al. |
| 8,617,242 B2 | 12/2013 | Philipp |
| 8,623,026 B2 | 1/2014 | Wong et al. |
| 8,634,617 B2 | 1/2014 | Tsougarakis et al. |
| 8,638,998 B2 | 1/2014 | Steines et al. |
| 8,641,716 B2 | 2/2014 | Fitz et al. |
| 8,657,827 B2 | 2/2014 | Fitz et al. |
| 8,663,333 B2 | 3/2014 | Metcalfe et al. |
| 8,682,052 B2 | 3/2014 | Fitz et al. |
| 8,690,945 B2 | 4/2014 | Fitz et al. |
| 8,709,089 B2 | 4/2014 | Lang et al. |
| 8,731,885 B2 | 5/2014 | Iannotti et al. |
| 8,735,773 B2 | 5/2014 | Lang |
| 8,744,148 B2 | 6/2014 | Nord et al. |
| 8,768,028 B2 | 7/2014 | Lang et al. |
| 8,771,365 B2 | 7/2014 | Bojarski et al. |
| 8,774,900 B2 | 7/2014 | Buly et al. |
| 8,775,133 B2 | 7/2014 | Schroeder |
| 8,781,557 B2 | 7/2014 | Dean et al. |
| 8,814,942 B2 | 8/2014 | Anthony et al. |
| 8,843,229 B2 | 9/2014 | Vanasse et al. |
| 8,864,769 B2 | 10/2014 | Stone et al. |
| 8,882,847 B2 | 11/2014 | Burdulis, Jr. et al. |
| 8,884,618 B2 | 11/2014 | Mahfouz |
| 8,888,855 B2 | 11/2014 | Roche et al. |
| 8,898,043 B2 | 11/2014 | Ashby et al. |
| 8,906,107 B2 | 12/2014 | Bojarski et al. |
| 8,926,706 B2 | 1/2015 | Bojarski et al. |
| 8,932,361 B2 | 1/2015 | Tornier et al. |
| 8,932,363 B2 | 1/2015 | Tsougarakis et al. |
| 8,934,961 B2 | 1/2015 | Lakin et al. |
| 8,945,230 B2 | 2/2015 | Lang et al. |
| 8,951,259 B2 | 2/2015 | Fitz et al. |
| 8,951,260 B2 | 2/2015 | Lang et al. |
| 8,965,088 B2 | 2/2015 | Tsougarakis et al. |
| 8,971,606 B2 | 3/2015 | Chaoui |
| 8,974,539 B2 | 3/2015 | Bojarski et al. |

(56) References Cited

U.S. PATENT DOCUMENTS

| | | |
|---|---|---|
| 8,984,731 B2 | 3/2015 | Broeck et al. |
| 8,989,460 B2 | 3/2015 | Mahfouz |
| 8,992,538 B2 | 3/2015 | Keefer |
| 8,998,915 B2 | 4/2015 | Fitz et al. |
| 9,020,788 B2 | 4/2015 | Lang |
| 9,023,050 B2 | 5/2015 | Lang et al. |
| 9,055,953 B2 | 6/2015 | Lang et al. |
| 9,060,788 B2 | 6/2015 | Bollinger |
| 9,066,728 B2 | 6/2015 | Burdulis, Jr. et al. |
| 9,072,531 B2 | 7/2015 | Fitz et al. |
| 9,084,617 B2 | 7/2015 | Lang et al. |
| 9,095,353 B2 | 8/2015 | Burdulis, Jr. et al. |
| 9,107,679 B2 | 8/2015 | Lang et al. |
| 9,107,680 B2 | 8/2015 | Fitz et al. |
| 9,113,921 B2 | 8/2015 | Lang et al. |
| 9,125,672 B2 | 9/2015 | Fitz et al. |
| 9,126,673 B1 | 9/2015 | Green et al. |
| 9,180,015 B2 | 11/2015 | Fitz et al. |
| 9,186,161 B2 | 11/2015 | Lang et al. |
| 9,186,254 B2 | 11/2015 | Fitz et al. |
| 9,208,558 B2 | 12/2015 | Dean et al. |
| 9,211,199 B2 | 12/2015 | Ratron |
| 9,216,025 B2 | 12/2015 | Fitz et al. |
| 9,220,516 B2 | 12/2015 | Lang et al. |
| 9,220,517 B2 | 12/2015 | Lang et al. |
| 9,232,955 B2 | 1/2016 | Bonin, Jr. et al. |
| 9,237,950 B2 | 1/2016 | Hensley et al. |
| 9,241,724 B2 | 1/2016 | Lang et al. |
| 9,241,725 B2 | 1/2016 | Lang et al. |
| 9,275,191 B2 | 3/2016 | Dean et al. |
| 9,278,413 B2 | 3/2016 | Sperling |
| 9,292,920 B2 | 3/2016 | Dean et al. |
| 9,295,481 B2 | 3/2016 | Fitz et al. |
| 9,295,482 B2 | 3/2016 | Fitz et al. |
| 9,301,768 B2 | 4/2016 | Buza et al. |
| 9,308,005 B2 | 4/2016 | Fitz et al. |
| 9,308,053 B2 | 4/2016 | Bojarski et al. |
| 9,308,091 B2 | 4/2016 | Lang |
| 9,314,256 B2 | 4/2016 | Fitz et al. |
| 9,320,608 B2 | 4/2016 | Sperling |
| 9,320,620 B2 | 4/2016 | Bojarski et al. |
| 9,326,780 B2 | 5/2016 | Wong et al. |
| 9,326,862 B2 | 5/2016 | Smith et al. |
| 9,330,206 B2 | 5/2016 | Dean et al. |
| 9,333,085 B2 | 5/2016 | Fitz et al. |
| 9,351,743 B2 | 5/2016 | Kehres et al. |
| 9,358,018 B2 | 6/2016 | Fitz et al. |
| 9,381,025 B2 | 7/2016 | Fitz et al. |
| 9,381,026 B2 | 7/2016 | Trouilloud et al. |
| 9,387,083 B2 | 7/2016 | Al Hares et al. |
| 9,402,726 B2 | 8/2016 | Linderman et al. |
| 9,408,615 B2 | 8/2016 | Fitz et al. |
| 9,408,616 B2 | 8/2016 | Kehres et al. |
| 9,408,686 B1 | 8/2016 | Miller et al. |
| 9,414,928 B2 | 8/2016 | Sperling |
| 9,439,767 B2 | 9/2016 | Bojarski et al. |
| 9,486,226 B2 | 11/2016 | Chao |
| 9,495,483 B2 | 11/2016 | Steines et al. |
| 9,498,344 B2 | 11/2016 | Hodorek et al. |
| 9,517,134 B2 | 12/2016 | Lang |
| 9,539,013 B2 | 1/2017 | Katrana et al. |
| 9,554,910 B2 | 1/2017 | Vanasse et al. |
| 9,575,931 B2 | 2/2017 | Ratron |
| 9,579,106 B2 | 2/2017 | Lo et al. |
| 9,579,110 B2 | 2/2017 | Bojarski et al. |
| 9,603,711 B2 | 3/2017 | Bojarski et al. |
| 9,615,839 B2 | 4/2017 | Olson |
| 9,626,756 B2 | 4/2017 | Dean et al. |
| 9,636,229 B2 | 5/2017 | Lang et al. |
| 9,646,113 B2 | 5/2017 | Park et al. |
| 9,662,214 B2 | 5/2017 | Li et al. |
| 9,668,873 B2 | 6/2017 | Winslow et al. |
| 9,672,302 B2 | 6/2017 | Dean et al. |
| 9,672,617 B2 | 6/2017 | Dean et al. |
| 9,675,471 B2 | 6/2017 | Bojarski et al. |
| 9,681,956 B2 | 6/2017 | Al Hares et al. |
| 9,687,945 B2 | 6/2017 | Steines et al. |
| 9,700,420 B2 | 7/2017 | Fitz et al. |
| 9,700,971 B2 | 7/2017 | Lang |
| 9,713,533 B2 | 7/2017 | Taylor et al. |
| 9,715,563 B1 | 7/2017 | Schroeder |
| 9,717,508 B2 | 8/2017 | Iannotti et al. |
| 9,737,367 B2 | 8/2017 | Steines et al. |
| 9,741,263 B2 | 8/2017 | Iannotti et al. |
| 9,770,335 B2 | 9/2017 | Sperling |
| 9,775,680 B2 | 10/2017 | Bojarski et al. |
| 9,849,019 B2 | 12/2017 | Miller et al. |
| 9,872,773 B2 | 1/2018 | Lang et al. |
| 9,877,790 B2 | 1/2018 | Bojarski et al. |
| 9,895,230 B2 | 2/2018 | Mahfouz |
| 9,913,723 B2 | 3/2018 | Fitz et al. |
| 9,937,046 B2 | 4/2018 | Mahfouz |
| 9,943,370 B2 | 4/2018 | Asseln et al. |
| 9,956,047 B2 | 5/2018 | Bojarski et al. |
| 9,956,048 B2 | 5/2018 | Bojarski et al. |
| 9,993,341 B2 | 6/2018 | Vanasse et al. |
| 10,068,671 B2 | 9/2018 | Dean et al. |
| 10,085,839 B2 | 10/2018 | Wong et al. |
| 10,092,419 B2 | 10/2018 | Hanonouchi et al. |
| 10,405,993 B2 | 9/2019 | Deransart et al. |
| 10,433,969 B2 | 10/2019 | Humphrey |
| 10,537,390 B2 | 1/2020 | Varadarajan et al. |
| 10,548,737 B2 | 2/2020 | Hodorek et al. |
| 10,716,676 B2 | 7/2020 | Tornier et al. |
| 11,364,127 B2 | 6/2022 | Deransart et al. |
| 2001/0047210 A1 | 11/2001 | Wolf |
| 2002/0007294 A1 | 1/2002 | Bradbury et al. |
| 2002/0025358 A1* | 2/2002 | Nelson ............... B29C 43/50 425/422 |
| 2002/0059002 A1* | 5/2002 | Bonutti ............... A61B 17/885 623/908 |
| 2002/0082741 A1 | 6/2002 | Mazumder et al. |
| 2003/0028253 A1 | 2/2003 | Stone et al. |
| 2003/0074080 A1 | 4/2003 | Murray |
| 2003/0139818 A1 | 7/2003 | Rogers et al. |
| 2004/0045934 A1 | 3/2004 | Harvey |
| 2004/0064189 A1 | 4/2004 | Maroney et al. |
| 2004/0102866 A1 | 5/2004 | Harris et al. |
| 2004/0133276 A1 | 7/2004 | Lang et al. |
| 2004/0171924 A1 | 9/2004 | Mire et al. |
| 2004/0181144 A1 | 9/2004 | Cinquin et al. |
| 2004/0199258 A1 | 10/2004 | Macara |
| 2004/0243481 A1 | 12/2004 | Bradbury et al. |
| 2005/0049709 A1 | 3/2005 | Tornier |
| 2005/0065617 A1 | 3/2005 | Barrera et al. |
| 2005/0065628 A1 | 3/2005 | Roose |
| 2005/0098915 A1 | 5/2005 | Long |
| 2005/0112397 A1 | 5/2005 | Rolfe et al. |
| 2005/0197814 A1 | 9/2005 | Aram |
| 2005/0216305 A1 | 9/2005 | Funderud |
| 2006/0100714 A1 | 5/2006 | Ensign |
| 2006/0136058 A1 | 6/2006 | Pietrzak |
| 2006/0161167 A1 | 7/2006 | Myers et al. |
| 2007/0089518 A1 | 4/2007 | Ericson et al. |
| 2007/0118055 A1 | 5/2007 | McCombs |
| 2007/0118243 A1 | 5/2007 | Schroeder et al. |
| 2007/0173945 A1 | 7/2007 | Wiley et al. |
| 2007/0191741 A1 | 8/2007 | Tsai et al. |
| 2007/0198094 A1 | 8/2007 | Berelsman et al. |
| 2007/0244563 A1 | 10/2007 | Roche et al. |
| 2007/0249967 A1 | 10/2007 | Buly et al. |
| 2008/0014082 A1 | 1/2008 | Kunz et al. |
| 2008/0109000 A1 | 5/2008 | Maroney |
| 2008/0140209 A1 | 6/2008 | Iannotti et al. |
| 2008/0183297 A1 | 7/2008 | Boileau |
| 2008/0188945 A1* | 8/2008 | Boyce ............... A61B 17/0401 623/23.61 |
| 2008/0228269 A1 | 9/2008 | McLeod et al. |
| 2008/0243127 A1 | 10/2008 | Lang et al. |
| 2009/0099662 A1 | 4/2009 | Splieth et al. |
| 2009/0204225 A1 | 8/2009 | Meridew et al. |
| 2009/0226068 A1 | 9/2009 | Fitz et al. |
| 2009/0254091 A1 | 10/2009 | Long et al. |
| 2009/0264894 A1 | 10/2009 | Wasielewski |

(56) References Cited

U.S. PATENT DOCUMENTS

| | | |
|---|---|---|
| 2009/0292464 A1 | 11/2009 | Fuchs et al. |
| 2010/0082035 A1 | 4/2010 | Keefer |
| 2010/0087927 A1 | 4/2010 | Roche et al. |
| 2010/0114326 A1 | 5/2010 | Winslow et al. |
| 2010/0161066 A1 | 6/2010 | Iannotti et al. |
| 2010/0183757 A1* | 7/2010 | Casperson ............ B30B 15/026 425/78 |
| 2010/0191100 A1 | 7/2010 | Anderson et al. |
| 2010/0217270 A1 | 8/2010 | Polinski et al. |
| 2010/0303313 A1 | 12/2010 | Lang et al. |
| 2011/0029088 A1 | 2/2011 | Raucher et al. |
| 2011/0035013 A1 | 2/2011 | Winslow et al. |
| 2011/0040334 A1 | 2/2011 | Kaes et al. |
| 2011/0046735 A1 | 2/2011 | Metzger et al. |
| 2011/0054478 A1 | 3/2011 | Vanasse et al. |
| 2011/0118846 A1 | 5/2011 | Katrana et al. |
| 2011/0119884 A1 | 5/2011 | Ratron |
| 2011/0137424 A1 | 6/2011 | Lappin |
| 2011/0144760 A1 | 6/2011 | Wong et al. |
| 2012/0010711 A1* | 1/2012 | Antonyshyn ......... A61F 2/2875 425/395 |
| 2012/0078258 A1 | 3/2012 | Lo et al. |
| 2012/0109137 A1 | 5/2012 | Iannotti et al. |
| 2012/0116203 A1 | 5/2012 | Vancraen et al. |
| 2012/0130434 A1 | 5/2012 | Stemniski |
| 2012/0141034 A1 | 6/2012 | Iannotti et al. |
| 2012/0143267 A1 | 6/2012 | Iannotti et al. |
| 2012/0221112 A1 | 8/2012 | Lappin |
| 2012/0232670 A1 | 9/2012 | Bojarski et al. |
| 2012/0253350 A1 | 10/2012 | Anthony et al. |
| 2012/0253467 A1 | 10/2012 | Frankle |
| 2012/0276509 A1 | 11/2012 | Iannotti et al. |
| 2012/0279933 A1 | 11/2012 | Hensler et al. |
| 2012/0290272 A1 | 11/2012 | Bryan |
| 2012/0296339 A1 | 11/2012 | Iannotti et al. |
| 2013/0018378 A1 | 1/2013 | Hananouchi |
| 2013/0053968 A1 | 2/2013 | Nardini et al. |
| 2013/0110116 A1 | 5/2013 | Kehres et al. |
| 2013/0110471 A1 | 5/2013 | Lang et al. |
| 2013/0114873 A1 | 5/2013 | Chaoui |
| 2013/0150975 A1 | 6/2013 | Iannotti et al. |
| 2013/0172898 A1 | 7/2013 | Iannotti et al. |
| 2013/0190882 A1 | 7/2013 | Humphrey |
| 2013/0204375 A1 | 8/2013 | Winslow et al. |
| 2013/0211531 A1 | 8/2013 | Steines et al. |
| 2013/0245631 A1 | 9/2013 | Bettenga |
| 2013/0261629 A1 | 10/2013 | Anthony et al. |
| 2013/0274752 A1 | 10/2013 | Trouilloud et al. |
| 2013/0325134 A1 | 12/2013 | Viscardi et al. |
| 2013/0338673 A1 | 12/2013 | Keppler |
| 2014/0039633 A1 | 2/2014 | Roche et al. |
| 2014/0074246 A1 | 3/2014 | Huebner et al. |
| 2014/0142578 A1 | 5/2014 | Hananouchi et al. |
| 2014/0143267 A1 | 5/2014 | Iannotti et al. |
| 2014/0159282 A1* | 6/2014 | Smith ................. B29C 45/0001 425/589 |
| 2014/0236304 A1 | 8/2014 | Hodorek et al. |
| 2014/0257304 A1 | 9/2014 | Eash |
| 2014/0257495 A1 | 9/2014 | Goldberg |
| 2014/0257499 A1 | 9/2014 | Winslow et al. |
| 2014/0276867 A1 | 9/2014 | Kelley et al. |
| 2014/0303738 A1 | 10/2014 | Deffenbaugh et al. |
| 2014/0371863 A1 | 12/2014 | Vanasse et al. |
| 2015/0045903 A1 | 2/2015 | Neal |
| 2015/0073424 A1 | 3/2015 | Couture et al. |
| 2015/0093283 A1 | 4/2015 | Miller et al. |
| 2015/0105787 A1 | 4/2015 | Tornier et al. |
| 2015/0150688 A1 | 6/2015 | Vanasse et al. |
| 2015/0190151 A1 | 7/2015 | Budhabhatti et al. |
| 2015/0202045 A1 | 7/2015 | Early et al. |
| 2015/0223941 A1 | 8/2015 | Lang |
| 2015/0250552 A1 | 9/2015 | Radermacher et al. |
| 2015/0250597 A1 | 9/2015 | Lang et al. |
| 2015/0250601 A1 | 9/2015 | Humphrey |
| 2015/0265411 A1 | 9/2015 | Deransart et al. |
| 2015/0305891 A1 | 10/2015 | Bergin et al. |
| 2015/0320430 A1 | 11/2015 | Kehres et al. |
| 2015/0328004 A1 | 11/2015 | Mafhouz |
| 2016/0015466 A1 | 1/2016 | Park et al. |
| 2016/0030196 A1 | 2/2016 | Eraly et al. |
| 2016/0051367 A1 | 2/2016 | Gervasi et al. |
| 2016/0067049 A1 | 3/2016 | Flaherty et al. |
| 2016/0074052 A1 | 3/2016 | Keppler et al. |
| 2016/0100907 A1 | 4/2016 | Gomes |
| 2016/0120555 A1 | 5/2016 | Bonin, Jr. et al. |
| 2016/0136904 A1* | 5/2016 | Murai ..................... B29C 70/30 425/150 |
| 2016/0143744 A1 | 5/2016 | Bojarski et al. |
| 2016/0143749 A1 | 5/2016 | Holovacs et al. |
| 2016/0157937 A1 | 6/2016 | Kehres et al. |
| 2016/0166392 A1 | 6/2016 | Vanasse et al. |
| 2016/0184104 A1 | 6/2016 | Sperling |
| 2016/0193051 A1 | 7/2016 | Budhabhatti et al. |
| 2016/0213385 A1 | 7/2016 | Iannotti et al. |
| 2016/0242933 A1 | 8/2016 | Deransart et al. |
| 2016/0256222 A1 | 9/2016 | Walch |
| 2016/0270854 A1 | 9/2016 | Chaoui et al. |
| 2016/0296285 A1 | 10/2016 | Chaoui et al. |
| 2016/0296290 A1 | 10/2016 | Furrer et al. |
| 2016/0324648 A1 | 11/2016 | Hodorek et al. |
| 2016/0331467 A1 | 11/2016 | Slamin et al. |
| 2016/0345987 A1 | 12/2016 | Guilloux et al. |
| 2016/0374697 A1 | 12/2016 | Kehres et al. |
| 2017/0000614 A1 | 1/2017 | Mahfouz |
| 2017/0000615 A1 | 1/2017 | Mahfouz |
| 2017/0007330 A1 | 1/2017 | Britton et al. |
| 2017/0027587 A1 | 2/2017 | Fraone et al. |
| 2017/0027593 A1 | 2/2017 | Bojarski et al. |
| 2017/0027702 A1 | 2/2017 | Goldstein et al. |
| 2017/0056024 A1 | 3/2017 | Chao |
| 2017/0056187 A1 | 3/2017 | Humphrey et al. |
| 2017/0071748 A1 | 3/2017 | Humphrey |
| 2017/0079803 A1 | 3/2017 | Lang |
| 2017/0105841 A1 | 4/2017 | Vanasse et al. |
| 2017/0105843 A1 | 4/2017 | Britton et al. |
| 2017/0112626 A1 | 4/2017 | Miller et al. |
| 2017/0119531 A1 | 5/2017 | Bojarski et al. |
| 2017/0150978 A1 | 6/2017 | Iannotti et al. |
| 2017/0151058 A1 | 6/2017 | Sperling |
| 2017/0216038 A1 | 8/2017 | Lang et al. |
| 2017/0231783 A1 | 8/2017 | Lang et al. |
| 2017/0249440 A1 | 8/2017 | Lang et al. |
| 2017/0258598 A1 | 9/2017 | Radermacher et al. |
| 2017/0273800 A1 | 9/2017 | Emerick et al. |
| 2017/0273801 A1 | 9/2017 | Hodorek |
| 2017/0281357 A1 | 10/2017 | Taylor et al. |
| 2017/0296347 A1 | 10/2017 | Chua et al. |
| 2017/0304063 A1 | 10/2017 | Hatzidakis et al. |
| 2017/0340449 A1 | 11/2017 | Deransart et al. |
| 2017/0360567 A1 | 12/2017 | Fitz et al. |
| 2017/0367766 A1 | 12/2017 | Mahfouz |
| 2017/0367828 A1 | 12/2017 | Steines et al. |
| 2017/0367834 A1 | 12/2017 | Fitz et al. |
| 2018/0028325 A1 | 2/2018 | Bojarski et al. |
| 2018/0036019 A1 | 2/2018 | Iannotti et al. |
| 2018/0161176 A1 | 6/2018 | Vivanz et al. |
| 2018/0228614 A1 | 8/2018 | Lang et al. |
| 2018/0235706 A1 | 8/2018 | Asseln et al. |
| 2018/0235762 A1 | 8/2018 | Radermacher et al. |
| 2018/0263782 A1 | 9/2018 | Lang et al. |
| 2018/0289380 A1 | 10/2018 | Mauldin et al. |
| 2018/0338769 A1 | 11/2018 | Muir et al. |
| 2019/0015113 A1 | 1/2019 | Morvan |
| 2019/0015116 A1 | 1/2019 | Neichel et al. |
| 2019/0015117 A1 | 1/2019 | Neichel et al. |
| 2019/0015118 A1 | 1/2019 | Neichel et al. |
| 2019/0015119 A1 | 1/2019 | Athwal et al. |
| 2019/0015221 A1 | 1/2019 | Neichel et al. |
| 2019/0038360 A1 | 2/2019 | Chaoui |
| 2019/0175354 A1 | 6/2019 | Knox et al. |
| 2019/0343658 A1 | 11/2019 | Deransart et al. |
| 2020/0188121 A1 | 6/2020 | Boux de Casson et al. |
| 2020/0214845 A1 | 7/2020 | Knox et al. |
| 2020/0289276 A1 | 9/2020 | Lefebvre et al. |

(56) References Cited

U.S. PATENT DOCUMENTS

| | | |
|---|---|---|
| 2020/0383791 A1 | 12/2020 | Tornier et al. |
| 2020/0383792 A1 | 12/2020 | Cardon et al. |
| 2021/0228371 A1 | 7/2021 | Deransart et al. |
| 2021/0228372 A1 | 7/2021 | Knox et al. |
| 2022/0287850 A1 | 9/2022 | Daudet |
| 2022/0354658 A1 | 11/2022 | Knox et al. |

FOREIGN PATENT DOCUMENTS

| | | |
|---|---|---|
| CA | 2938709 | 5/2015 |
| DE | 10 2006 047663 | 4/2008 |
| EP | 1 249 213 | 10/2002 |
| EP | 1 265 555 | 12/2002 |
| EP | 1 563 810 | 8/2005 |
| EP | 1 862 151 | 12/2007 |
| EP | 1 902 689 | 3/2008 |
| EP | 1 952 788 | 8/2008 |
| EP | 2 135 576 | 12/2009 |
| EP | 1 917 051 | 6/2010 |
| EP | 2 243 445 | 10/2010 |
| EP | 2 324 801 A1 | 5/2011 |
| EP | 2 335 655 | 6/2011 |
| EP | 2 501 313 | 9/2012 |
| EP | 2 544 601 | 1/2013 |
| EP | 2583242 | 4/2013 |
| EP | 2 653 136 | 10/2013 |
| EP | 2 845 547 | 3/2015 |
| EP | 2 965 720 | 1/2016 |
| EP | 2 874 570 | 1/2017 |
| EP | 3 117 801 | 1/2017 |
| FR | 2 579 454 | 10/1986 |
| FR | 2 859 099 | 3/2005 |
| FR | 2962573 A1 | 1/2012 |
| FR | 2982694 B1 | 11/2016 |
| FR | 2982979 B1 | 11/2016 |
| FR | 2982693 B1 | 12/2016 |
| GB | 2501494 | 10/2013 |
| JP | 3179628 U | 11/2012 |
| WO | WO 93/025157 | 12/1993 |
| WO | WO 00/35346 | 6/2000 |
| WO | WO 00/59411 | 10/2000 |
| WO | WO 02/061688 | 8/2002 |
| WO | 2006106419 A2 | 10/2006 |
| WO | WO 2010/120346 | 10/2010 |
| WO | WO 2011/110374 | 9/2011 |
| WO | WO 2011/154891 | 12/2011 |
| WO | WO 2011/157961 | 12/2011 |
| WO | WO 2012/021241 | 2/2012 |
| WO | WO 2012/058349 | 5/2012 |
| WO | WO 2012/125319 | 9/2012 |
| WO | WO 2013/060851 | 5/2013 |
| WO | WO 2013/062848 | 5/2013 |
| WO | WO 2013/062851 | 5/2013 |
| WO | WO 2013/142998 | 10/2013 |
| WO | WO 2014/020561 | 2/2014 |
| WO | WO 2014/035991 | 3/2014 |
| WO | WO 2015/052586 | 4/2015 |
| WO | WO 2015/056097 | 4/2015 |
| WO | WO 2015/068035 | 5/2015 |
| WO | WO 2015/071757 | 5/2015 |
| WO | WO 2015/175397 | 11/2015 |
| WO | WO 2015/185219 | 12/2015 |
| WO | WO 2017/005514 | 1/2017 |
| WO | WO 2017/007565 | 1/2017 |
| WO | WO 2017/091657 | 6/2017 |
| WO | WO 2017/105815 | 6/2017 |
| WO | WO 2017/106294 | 6/2017 |
| WO | WO 2017/184792 | 10/2017 |
| WO | WO 2017/214537 | 12/2017 |
| WO | WO 2018/022227 | 2/2018 |
| WO | WO 2019/014278 | 1/2019 |
| WO | WO 2019/014281 | 1/2019 |
| WO | WO 2019/033037 | 2/2019 |
| WO | WO 2019/060780 | 3/2019 |

OTHER PUBLICATIONS

Linear Actuators Information retrieved from "https://web.archive.org/web/20160309160343/https://www.globalspec.com/learnmore/motion_controls/linear_actuators/linear_actuators" (Year: 2016).*

Non-Final Office Action issued in connection with U.S. Appl. No. 17/451,499, filed Feb. 9, 2024, 7 pages.

Non-Final Office Action issued in connection with U.S. Appl. No. 16/904,345, Feb. 15, 2022, 35 pages.

Non-Final Office Action issued in connection with U.S. Appl. No. 16/910,663, Dec. 15, 2022, 9 pages.

Non-Final Office Action issued in connection with U.S. Appl. No. 17/359,745, Nov. 26, 2023, 7 pages.

Final Office Action issued in connection with U.S. Appl. No. 16/910,663, Nov. 16, 2023, 9 pages.

Notice of Allowance issued in connection with U.S. Appl. No. 16/648,128, Feb. 16, 2024, 9 pages.

Communication Pursuant to Article 94(3) issued in connection with European Patent Application No. 18746503.4, Oct. 17, 2023, 5 pages.

Boileau, et al., "The three-dimensional geometry of the proximal humerus: implications for surgical technique and prosthetic design." The Journal of bone and joint surgery. British vol. 79.5 (1997): 857-865.

Dougherty, "Digital Image Processing for Medical Applications," May 11, 2009 (May 11, 2009), Cambridge University Press, XP002615721.

Gregory, et al.,"Accuracy of Glenoid Component Placement in Total Shoulder Arthroplasty and Its Effect on Clinical and Radiological Outcome in a Retrospective, Longitudinal, Monocentric Open Study," PLOS One, p. e75791, Aug. 1, 2013, vol. 8, No. 10.

Habets, et al., Computer assistance in orthopaedic surgery. Technische Universiteit Eindhoven, 2002.

Hempfing, et al. "Surgical landmarks to determine humeral head retrotorsion for hemiarthroplasty in fractures." Journal of shoulder and elbow surgery 10.5 (2001): 460-463.

Iannotti et al., "Prosthetic positioning in total shoulder arthroplasty," Journal of Shoulder and Elbow Surgery, Jan. 1, 2005, vol. 14, No. 1S, pp. S111-S121.

Kobashi et al., "Knowledge-Based Organ Identification from CT Images," Pattern Recognition, Elsevier, GB, vol. 28, No. 4, Apr. 1, 1995 (Apr. 1, 1995), pp. 475-491, XP004013165.

Lee, C.C. et al., "Identifying multiple abdominal organs from CT image series using a multimodule contextual neural network and spatial fuzzy rules", IEEE Transactions on Information Technology in Biomedicine, IEEE Services Center, Los Alamitos, CA, US, vol. 7, No. 3, Sep. 1, 2003 (Sep. 1, 2003) pp. 208-217, XP011100536.

Ma, et al., "Robust registration for computer-integrated orthopedic surgery: laboratory validation and clinical experience." Medical image analysis 7.3 (2003): 237-250.

"Olympia Total Shoulder System Surgical Technique", Wright Medical Technology, 2001, in 19 pages.

Radermacher, K., et al., "Computer Assisted Orthopaedic Surgery with Image Based Individual Templates," Clinical Orthopaedics and Related Research, No. 354, Sep. 1998, pp. 28-38.

Radermacher, K., et al., "Image Guided Orthopedic Surgery Using Individual Templates: Experimental Results and Aspects of the Development of a Demonstrator for Pelvis Surgery", Health Care Sector, Telematics Applications Program, 1997, pp. 606-615.

Tornier, "Salto Talaris, Total Ankle Prosthesis", 2009.

Valstar, et al. "Towards computer-assisted surgery in shoulder joint replacement." ISPRS journal of photogrammetry and remote sensing 56.5-6 (2002): 326-337.

Valstar, et al. "The use of Roentgen stereophotogrammetry to study micromotion of orthopaedic implants." ISPRS journal of photogrammetry and remote sensing 56.5-6 (2002): 376-389.

Welsh, et al., "CT-based preoperative analysis of scapula morphology and glenohumeral joint geometry." Computer Aided Surgery 8.5 (2003): 264-268.

Wu, et al. "An interface for the data exchange between CAS and CAD/CAM systems." International Congress Series. vol. 1256. Elsevier, 2003.

(56) References Cited

OTHER PUBLICATIONS

Zimmer, "Zimmer® PSI Shoulder Trabecular MetalTM Reverse Glenoid Base Plate Surgical Technique", Dec. 30, 2013.
Non-Final Office Action issued in connection with U.S. Appl. No. 16/785,228, May 27, 2021, 33 pages.
Favre, et al., "Influence of component positioning on impingement in conventional total shoulder arthroplasty," Clinical Biomechanics, Butterworth Scientifics, Nov. 5, 2007, pp. 174-183, vol. 23, No. 2, Guilford, GB.
Hernigou, et al., "Determining humeral retroversion with computed tomography." Journal of bone and joint surgery. Oct. 2002;84-A(10):1753-62.
Lee, C.C. et al., "Recognizing Abdominal Organs in CT Images Using Contextual Neural Network and Fuzzy Rules", Engineering in Medicine and Biology Society, 2000. Proceedings of the 22nd Annual International Conference of the IEEE Jul. 23-28, 2000, Piscataway, NJ, USA, IEEE, vol. 3, Jul. 23, 2000 (Jul. 23, 2000), pp. 1745-1748, XP010530837.
Nguyen, et al., "A New Segmentation Method for MRI Images of the Shoulder Joint", Computer and Robot Vision, 2007. CRV '07. Fourth Canadian Conference on, IEEE, PI, May 1, 2007 (May 1, 2007), pp. 329-338, XP031175821.
Tamez-Pena et al., "The Integration of Automatic Segmentation and Motion Tracking for 4D Reconstruction and Visualization of Musculoskeletal Structures," Biomedical Image Analysis, 1998. Proceedings. Workshop on Santa Barbara, CA US, Jun. 26-27, 1998, Los Alamitos, CA, USA, IEEE Comput. Soc. US, Jun. 26, 1998 (Jun. 26, 1998), pp. 154-163, XP010291418.
"Zimmer® PSI Shoulder Planning", Zimmer Biomet TV, posted Jul. 11, 2014, retrieved from internet on Jan. 9, 2020, <https://zimmerbiomet.tv/videos/1025?a=surgeon&version=1190>.
Extended European Search Report issued in EP Application No. 16305351.2, dated May 20, 2016 in 9 pages.
First Office Action issued in corresponding Japanese Patent Application No. 2021-506973, Jun. 5, 2023, 5 pages.
Non-Final Office Action issued in connection with U.S. Appl. No. 17/650,722, Nov. 15, 2023, 10 pages.
Notice of Allowance issued in connection with U.S. Appl. No. 17/645,607, Dec. 20, 2023, 11 pages.
Communication Pursuant to Article 94(3) issued in connection with European Patent Application No. 19759204.1, May 9, 2023, 6 pages.
Extended European Search Report issued in connection with European Patent Application No. 24162840.3, Jun. 21, 2024, 11 pages.
First Office Action issued in connection with Japanese Patent Application No. 2024-005430, Feb. 12, 2025, 15 pages.

* cited by examiner

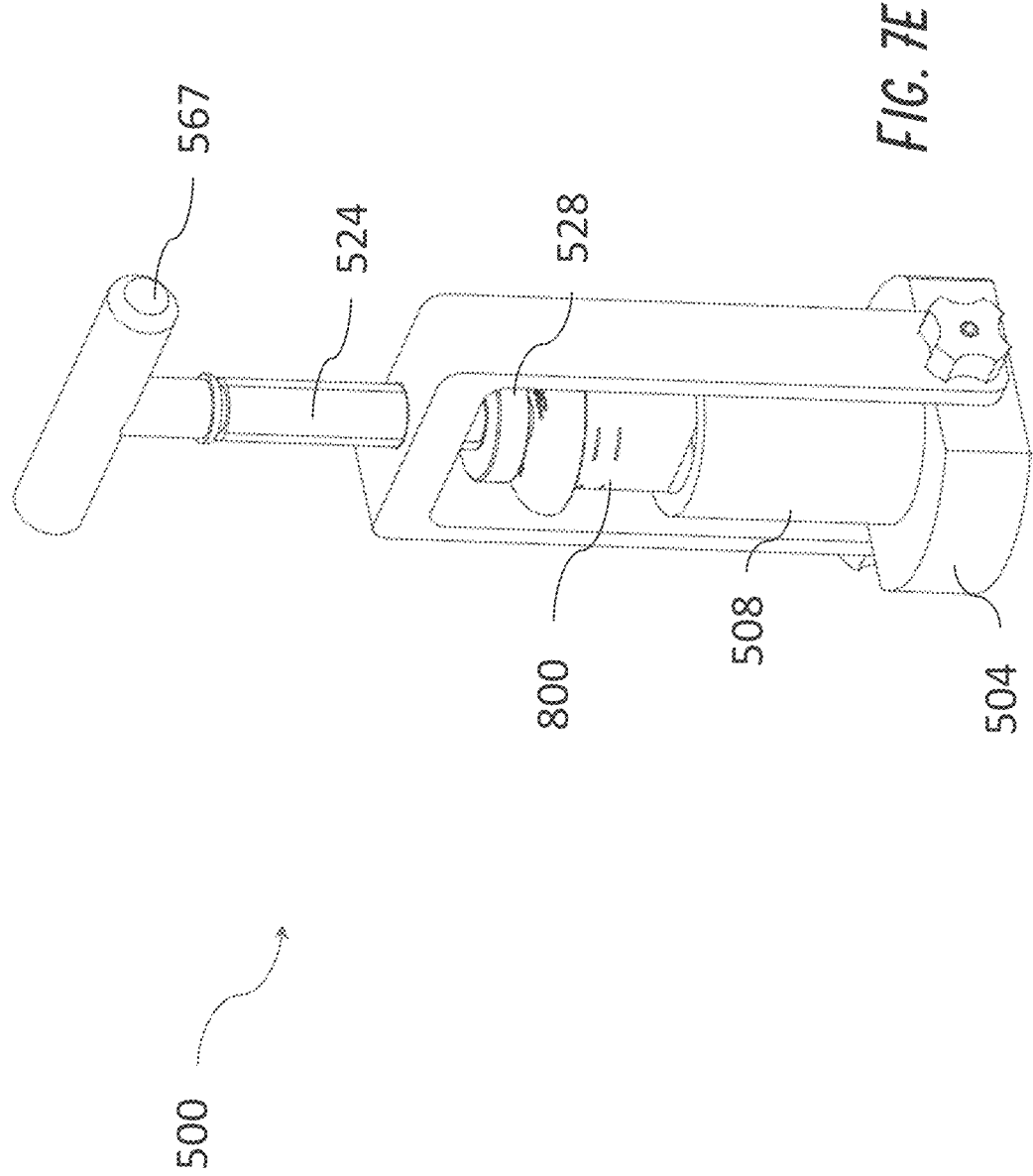

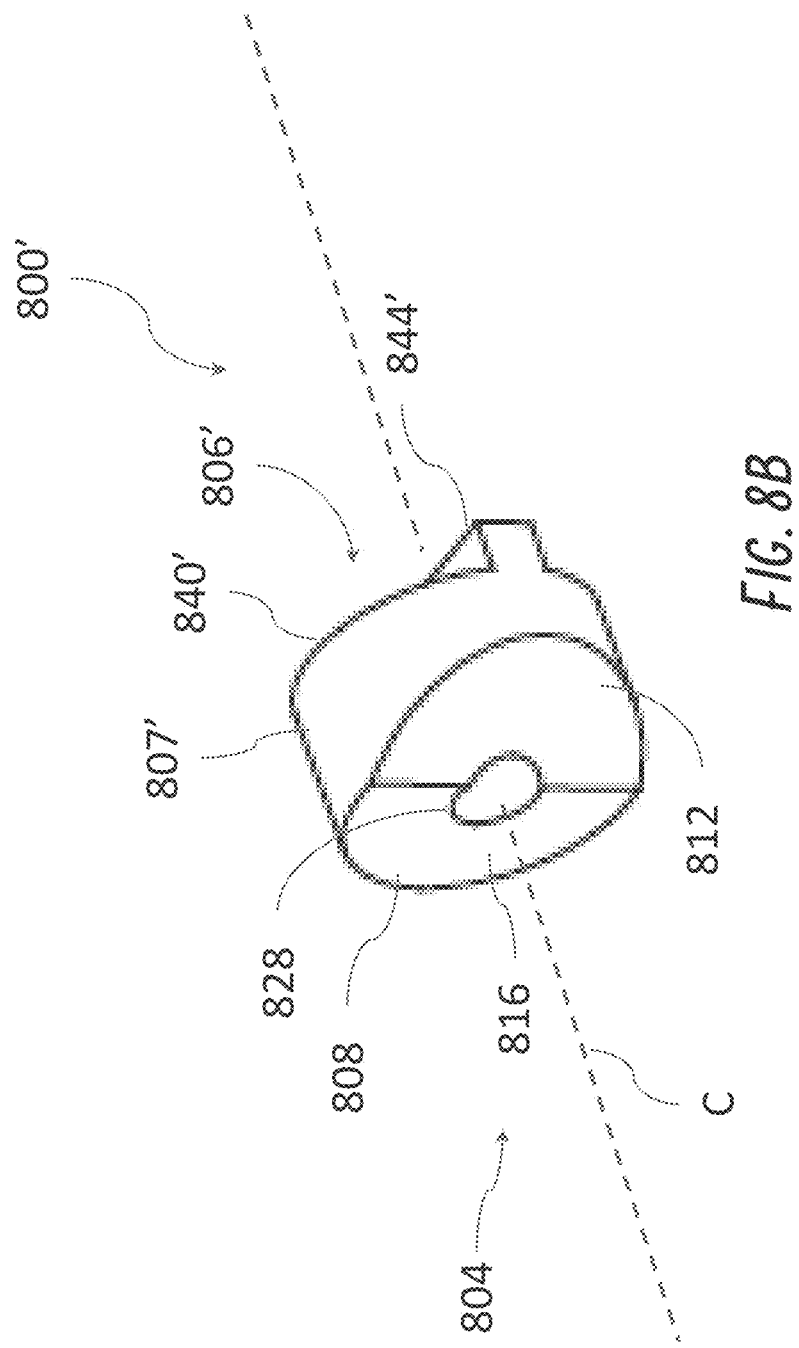

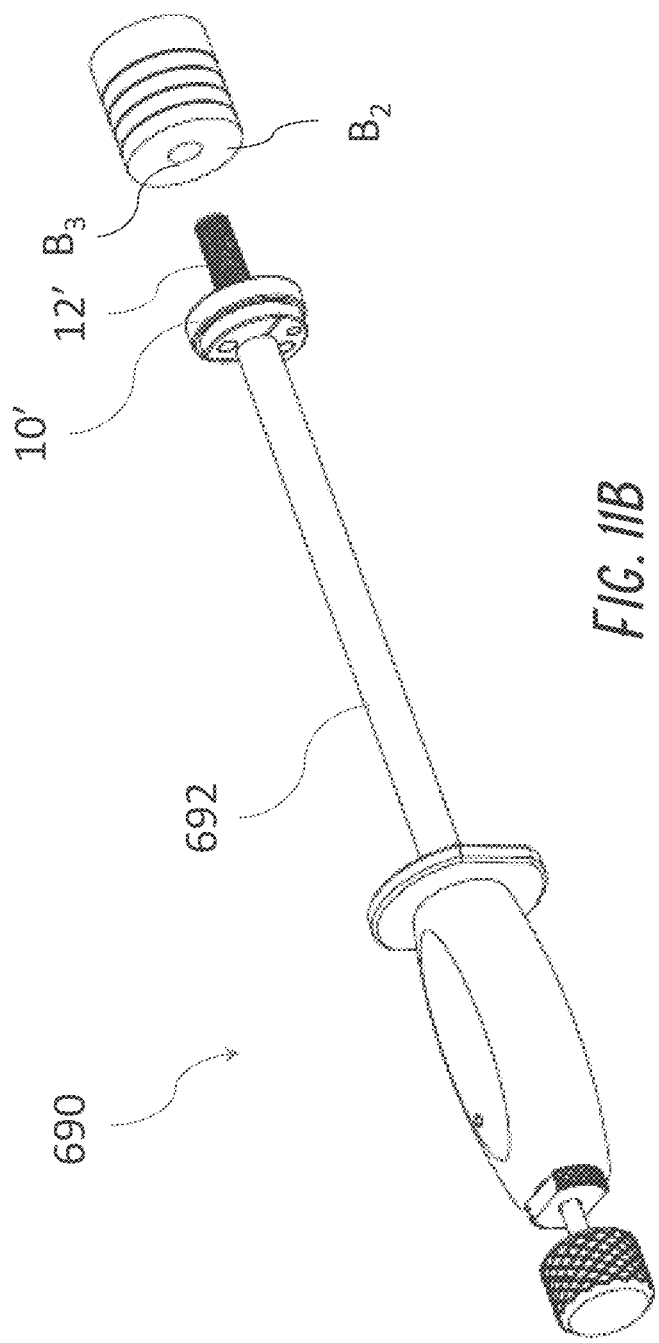

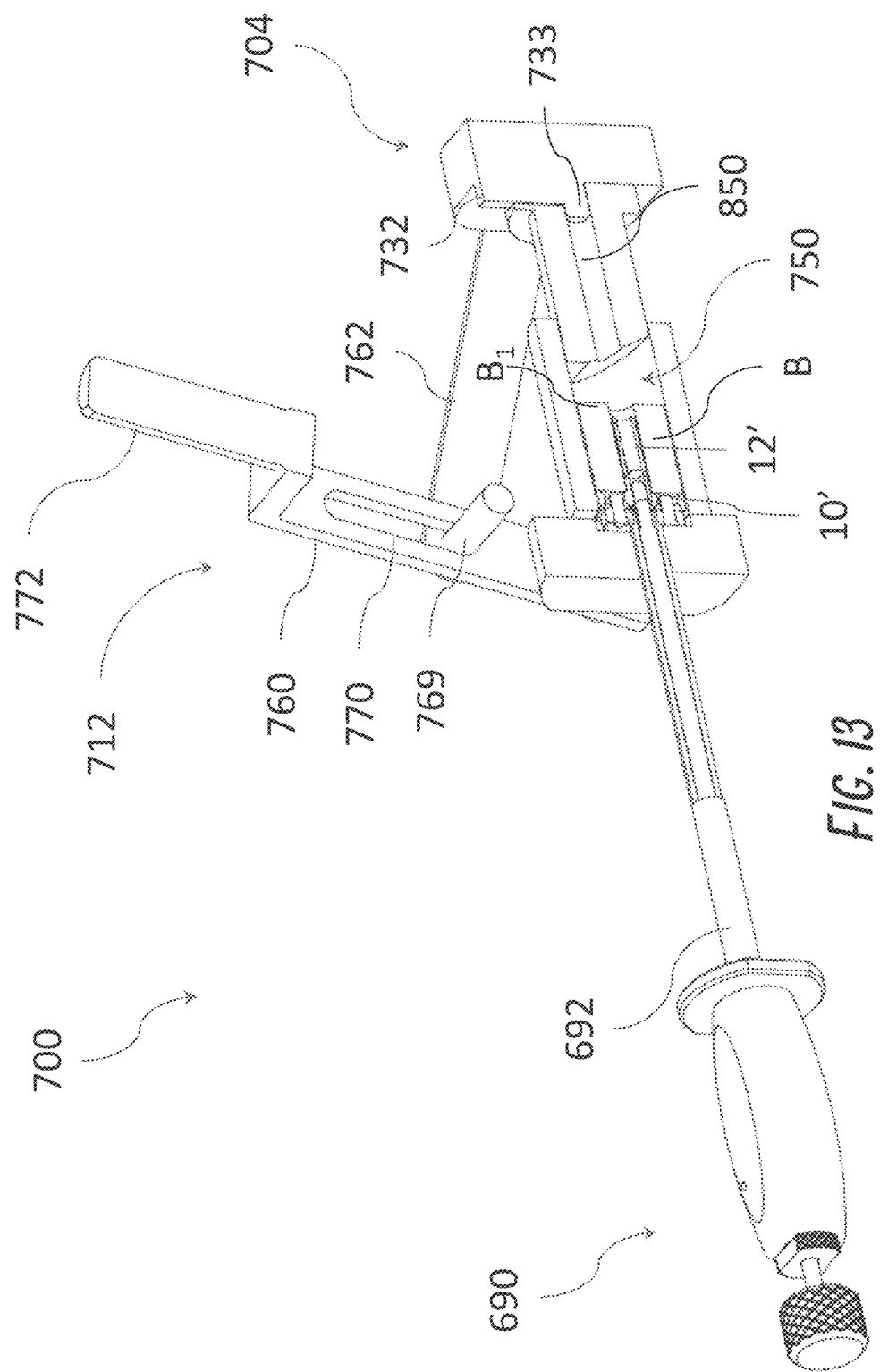

BONE GRAFT SHAPER AND PATIENT SPECIFIC BONE GRAFT

CROSS REFERENCE TO RELATED APPLICATIONS

This application claims the benefit of U.S. patent application Ser. No. 15/426,720, filed Feb. 7, 2017 and European Patent Application No. EP 16305351.5 filed Mar. 25, 2016, all of which are incorporated by reference for all purposes as if fully set forth herein.

BACKGROUND OF THE INVENTION

Field of the Invention

This application is directed to patient specific methods and devices useful in shoulder arthroplasty and other joint and orthopedic surgery.

Description of the Related Art

Arthroplasty is the standard of care for the treatment of advanced shoulder joint problems, such as severe arthritis. Shoulder arthroplasty can replicate the anatomical form of a joint, with a spherical component mounted on the proximal humerus and a concave surface mounted on the glenoid region of the scapula. Certain patients benefit from a reverse shoulder reconstruction in which a spherical component is mounted to the scapula and a concave surface is positioned on the proximal humerus. Articulation of the spherical component on the concave surface provides the patient with improved arm motion.

One leading reverse shoulder technique, known as bony increased offset reverse shoulder arthroplasty or BIO-RSA provides improved outcomes for patients. BIO-RSA involves placing a spacer between the glenoid region of the scapula and a spherical joint component that is coupled with the glenoid. Among other benefits, BIO-RSA can improve range of motion, limit notching of the scapula, and correct bone deficiency.

Surgeons currently use standard spacers in BIO-RSA, for example with medial and lateral surfaces parallel to each other, disposed at a 12.5 degree angle relative to each other, and with limited options for thickness, such as 7 mm or 10 mm. In cases where the glenoid region surface is worn and may have missing bone portions a spacer with a flat surface will not seat properly against the glenoid and early loosening of the implant can result from improper seating. Further, in cases where the glenoid region surface is worn and may have missing bone portions excessive reaming of the bone may be needed to establish a flat surface on which a spacer can be seated. However excessive reaming of the glenoid surface can remove the dense subchondral bone and expose the soft and porous cancellous bone which is a poor seating surface for the spacer. Early loosening of the implant can be a consequence of excessive reaming. What is needed is a spacer than can conform to the worn glenoid surface without excessive reaming of the scapula.

SUMMARY OF THE INVENTION

A great improvement in BIO-RSA and other procedures that would benefit from adjusting lateral position of a component on a scapula would result if methods and systems could form and employ patient specific spacers. Patient specific spacers would better adapt to patient joint surface shape, for example at or around the glenoid surface of the scapula. Patient specific spacers can be formed anticipating that some reaming may occur, but that the glenoid will not be altered as extensively as in a conventional procedure. Patient specific spacers can be formed based on information about the condition and/or the shape of the joint surface of the patient to be augmented by a spacer. The patient information can be collected by a CT scan or by any other surface characterization technology. Thereafter, the patient information can be used as an input to shape a spacer from a bone graft material. The system and method can be used to shape any one or more of a section of bone from a proximal portion of the humerus, an allograft, a synthetic bone, or another structure. In a preferred embodiment the spacer is formed from a unitary piece of bone. The system and method can be used to form a plurality of pieces of bone or synthetic bone stock into a solid, unitary patient specific spacer.

In one embodiment a joint prosthesis method is provided. A first prosthesis component is placed in a chamber of a bone press. The first prosthesis component has a first side, e.g., a medial side, and a second side, e.g., a lateral side, oriented away from the first side, e.g., the medial side. A bone graft blank is placed in the chamber of the bone press between a contoured surface of a patient specific insert negative and the first prosthesis component. A bone contact surface of the bone graft blank faces, e.g., is in contact with, the contoured surface of the patient specific insert negative when so placed. The bone contact surface of the bone graft blank is compressed against the contoured surface of the patient specific insert negative. The bone contact surface is reshaped to form a patient specific bone graft.

In a variation of the foregoing method, three dimensional spatial location information of a lateral portion of a bone is obtained. The contoured surface of the patient specific insert negative is formed based on the three dimensional spatial location information. The three dimensional spatial location information can be information of or from a scapula, e.g., including information of or from at least a portion of a glenoid surface.

In a variation of the foregoing methods, the first (e.g., medial) side of the first prosthesis component can be a side oriented toward a glenoid of a shoulder joint when applied and the second (e.g., lateral) side can be oriented toward a second prosthesis component coupled with the humerus. In an elbow method, the first prosthesis component can comprise a portion of a distal humeral component of a prosthetic elbow joint and the second side can face a bone such as a resected humerus. Likewise, if the second side faces a second joint component, the first side could face a bone such as resected, reamed or otherwise prepared radius and/or ulna of the patient.

In another embodiment, a joint prosthesis method is provided. A prosthesis component is placed in a chamber of a bone press. The prosthesis component has a first side, e.g., a medial side, and a second side, e.g., a lateral side. The first side is configured to be orientated toward the patient, e.g., toward a glenoid. The second side configured to articulate with another prosthesis component when implanted, e.g., with a humeral component. A bone graft blank is placed in the chamber of the bone press between a contoured surface and the prosthesis component. The contoured surface can be part of the bone press or can comprise a surface of a patient specific negative that can be inserted into the bone press. A bone contact surface of the bone graft blank is disposed in the chamber to face, e.g., to be in contact with, the contoured surface of the patient specific insert negative. The bone contact surface of the bone graft blank is compressed against a surface in the bone press, e.g., against the contoured surface of the insert negative. The bone contact surface is reshaped to form a patient specific bone graft.

In another embodiment a method of forming a bone press component is provided. Three dimensional spatial location information of a bone portion of a joint is obtained. A patient specific insert negative is formed. The patient specific insert negative has a contoured surface that is based on the three dimensional spatial location information. The patient specific insert negative is configured to be mounted on a bone press and to shape a bone graft blank upon application of pressure in the bone press.

In the method described in the preceding paragraph, the joint can be a shoulder joint and the contoured surface can match, replicate or otherwise correspond to a surface of the glenoid. The surface to which the contoured surface is matched, replicates or to which the surface otherwise corresponds can be that of the glenoid before or after a bone preparation process such as reaming, drilling or cutting. In other variations, the joint can be an elbow joint and the contoured surface can match, replicate or otherwise correspond to a surface of the humerus. The surface to which the contoured surface is matched, replicates or to which the surface otherwise corresponds can be that of the humerus before or after a bone preparation process such as reaming, drilling or cutting.

In another embodiment a method of forming a patient specific bone graft is provided. A bone press is provided that has a patient specific insert negative disposed in a pressing zone thereof. The patient specific insert negative has a contoured surface that is based on three dimensional spatial location information of a bone portion to which the patient specific bone graft is to be coupled. A bone graft blank is placed into the pressing zone. The bone graft blank is compressed against the contoured surface of the patient specific insert negative. The compression causes a bone contacting surface of the bone graft blank to conform to the contoured surface of the patent specific insert negative. A patient specific bone graft is thereby formed.

In another embodiment, a bone press is provided. The bone press includes a base, a compression plate, and a housing. The compression plate is disposed opposite of the base. The housing is configured to extend between the base and the compression plate. The housing extends along a longitudinal axis of the bone press when so placed. A pressing zone is disposed within the housing and between the base and the compression plate along the longitudinal axis of the bone press. An actuator provides relative movement between the compression plate and the base to create compression in the pressing zone.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

FIG. 7(E) is an assembled view of the bone press of FIG. 5, with an actuator engaged with the patient specific insert negative prior to compressing the bone graft blank in the pressing zone;

FIG. 8(A)-1 is a bottom view of the patient specific insert negative shown in FIG. 8(A);

FIG. 8(B) shows a perspective view of a second embodiment of a patient specific insert negative;

FIG. 11(B) is a partial exploded view similar to that of FIG. 11(A) showing the joint prosthesis component mounted on the impactor;

FIG. 13 is partial cross-sectional view of the bone press of FIG. 12 taken along section plane 13-13;

DETAILED DESCRIPTION OF THE PREFERRED EMBODIMENT

While the present description sets forth specific details of various embodiments, it will be appreciated that the description is illustrative only and should not be construed in any way as limiting. Furthermore, various applications of such embodiments and modifications thereto, which may occur to those who are skilled in the art, are also encompassed by the general concepts described herein. Each and every feature described herein, and each and every combination of two or more of such features, is included within the scope of the present invention provided that the features included in such a combination are not mutually inconsistent.

This application is directed to patient specific bone grafts, methods for forming and using, as well as apparatuses for forming, such grafts. As discussed above, patient specific grafts can be clinically useful in supplementing eroded, thin or weak bone to which a prosthesis component, such as a glenoid baseplate, is to be coupled. BIO-RSA is one procedure where such grafts can be used. The apparatuses and methods disclosed herein enable novel and less traumatic bone preserving joint replacement techniques. The apparatuses and methods disclosed herein can extend orthopedic treatments to patients who would otherwise not be treatable and can help preserve the possibility of future revisions if needed.

Figure 1:
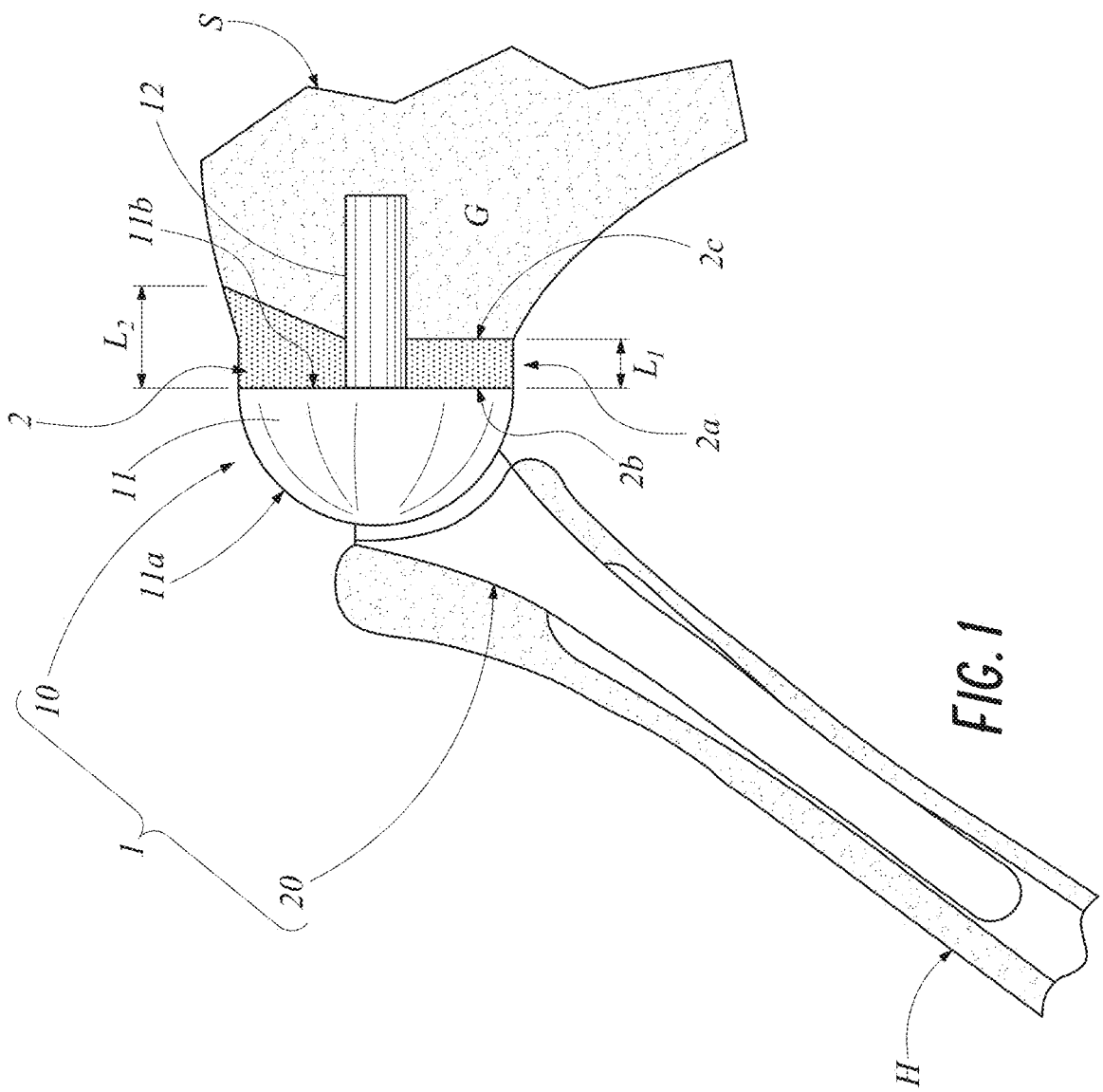
FIG. 1 is a partial cross-section of a shoulder joint, including portions of a scapula and a humerus as well as a reverse shoulder joint prosthesis components coupled therewith.

FIG. 1 shows a shoulder prosthesis 1 comprising a glenoid component 10 implanted in the scapula S and a humeral component 20 implanted in the humerus H of a patient's shoulder. The glenoid component 10 has a head 11 which has, on a lateral side, a convex articular surface 11A of generally hemispherical shape. The lateral side is a side facing away from the glenoid surface G of the scapula S. The head 11 has an opposing face 11B disposed on a medial side. The medial side is a side facing toward the glenoid surface. In FIG. 1, the face 11B is generally planar but the face 11B can have other shapes. FIG. 1 illustrates what is sometimes referred to as a reverse should prosthesis because the position of the convex portion of the shoulder joint is the opposite of that of normal anatomy.

Figure 1A:
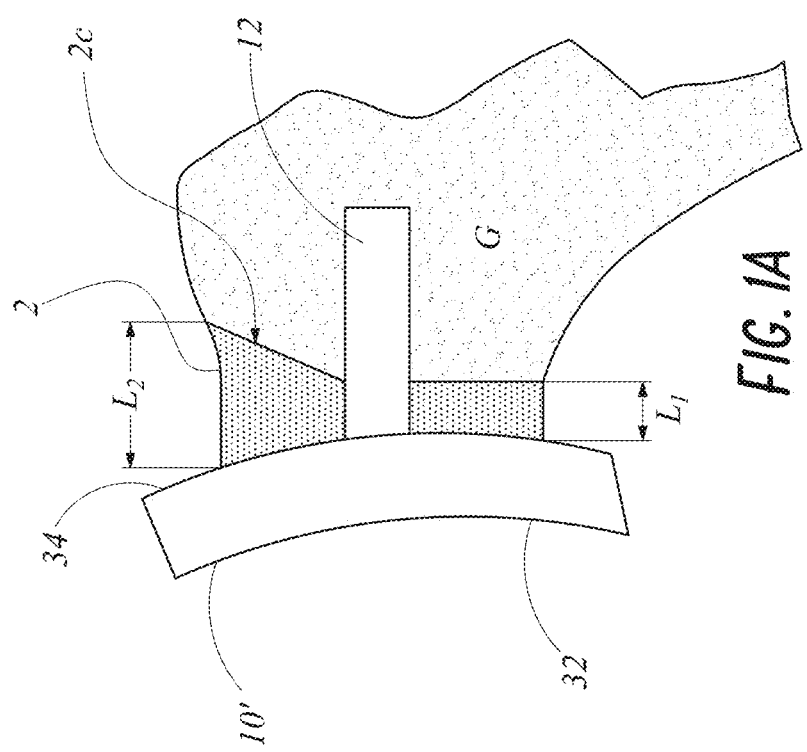
FIG. 1A is a partial cross-section of a scapula having a glenoid component of an anatomical shoulder joint prosthesis coupled therewith.

FIG. 1A shows another approach to shoulder replacement where a component 10' having a concave surface 32 is mounted to the glenoid G. The component 10' is sometimes referred to herein as a baseplate, though a baseplate can include any structure of a prosthesis that directly contacts a side of a bone graft. The concave surface 32 is configured to receive a spherical member of a humeral component. An opposing face 34 of the component 10' is oriented toward the glenoid G. The surface 32 is on a lateral side of and the face 34 is on the medial side of the components 10'.

The glenoid components 10, 10' can also comprise an anchor member 12 that extends from the face 11B (or the face 34) in the direction away from the face 11A (or the surface 32). The free end of the anchor member 12 is securely anchored in the scapula S through the glenoid surface G when these components 10, 10' are implanted to join the components to the scapula S. By way of non-illustrated variation, the anchor member 12 can be externally threaded or, generally, have a surface state promoting bony ingrowth or other mode of anchoring. The anchor member 12 can be separable from or a unitary construction with other the component 10, 10'.

A bone graft 2 is positioned between the glenoid surface G and the face 11B, 34 of the respective glenoid components 10, 10'. The bone graft 2 has a periphery 2A and a lateral surface 2B. The lateral surface 2B is located on the side of the bone graft 2 disposed away from the glenoid surface G. The lateral surface 2B is covered by the face 11B of the head 11 or by the face 34 of the baseplate 10'. A medial surface 2C of the bone graft 2 faces and usually is in direct contact with the glenoid surface G. Once the bone graft 2 fuses with the glenoid surface G, the effective glenoid surface is displaced laterally outward to the distal surface 2B of the bone graft 2.

FIG. 1 shows that the bone graft 2 can have a non-constant thickness. For example, a dimension $L_1$ at the inferior portion of the glenoid can be smaller than a dimension $L_2$ at a superior portion. Providing greater medial-lateral thickness at the superior portion can compensate for wear. Because the bone degradation or wear of every patient is different, the best thickness of the bone graft 2 for superior and inferior portions can be different for each given patient. Specific methods and apparatuses to discern the best thickness profile or other configuration of the bone graft 2 and to form the bone graft accordingly are discussed hereinbelow. More particularly, the medial face 2C preferably has a three-dimensional morphology that matches the three-dimensional morphology of, e.g., is a negative of, the glenoid or of the glenoid as the clinician intends to modify it prior to mounting the glenoid component 10, 10' to the scapula.

Methods Related to Making Patient Specific Bone Grafts

A number of methods can be employed to make bone grafts for a joint procedure that are specific to a particular patient. These methods can be performed by a manufacturer of prostheses, by an imaging service provider, by a surgeon, or by a combination of an imaging service provider, a manufacturer, and a surgeon at the direction and under the control of the surgeon or other participants in these processes.

Figure 2:
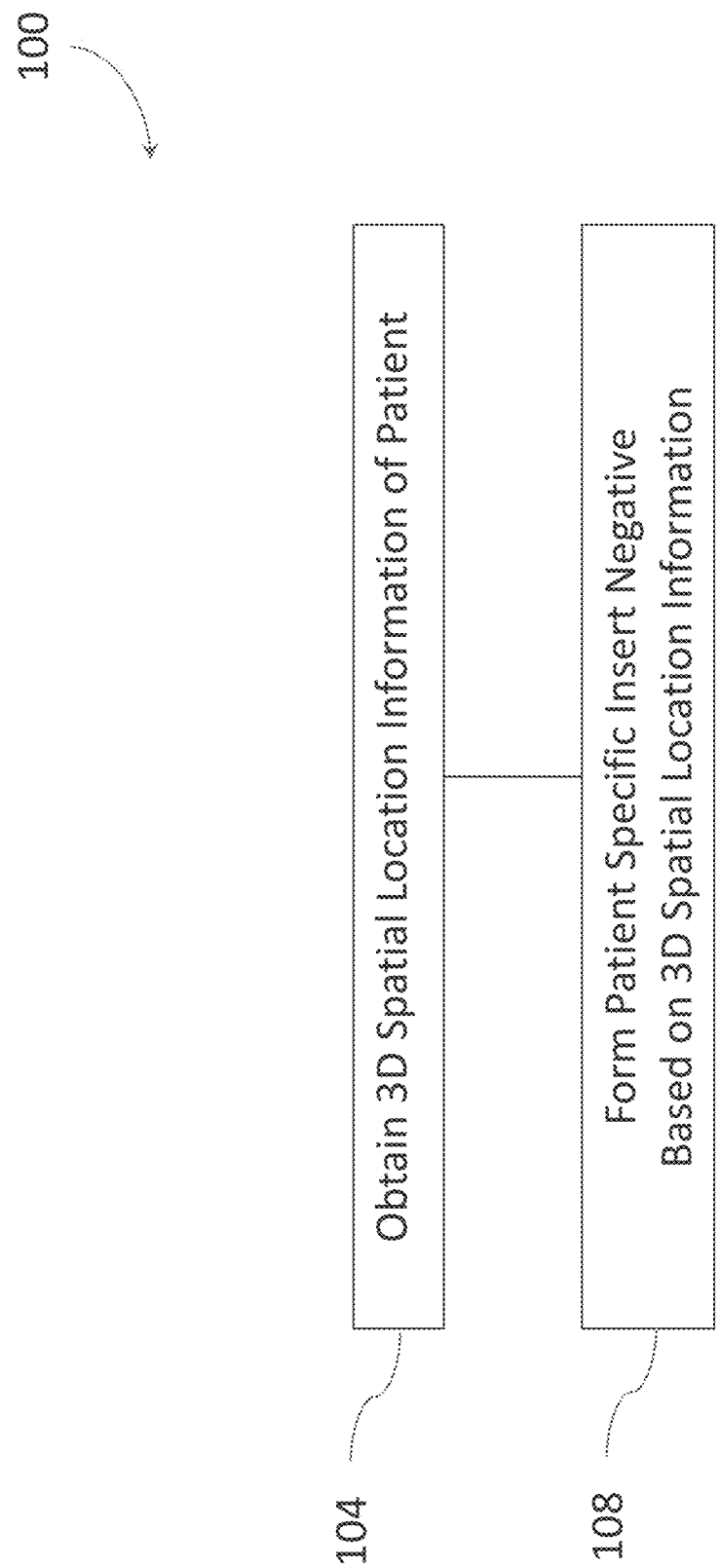
FIG. 2 illustrates a method of forming a patient specific insert negative, which can be used in a bone press, based on spatial location information.
Figures 1, 8A:
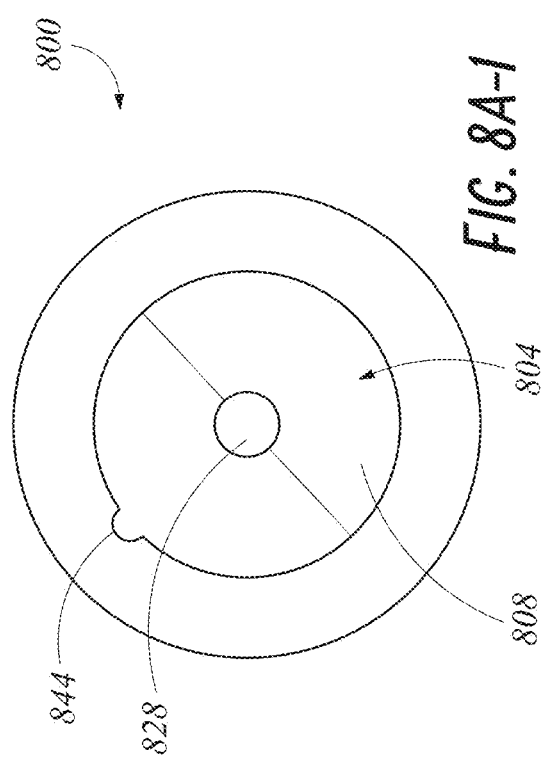
FIG. 8(A) shows a perspective view of a first embodiment of a patient specific insert negative.
Figure 8A:
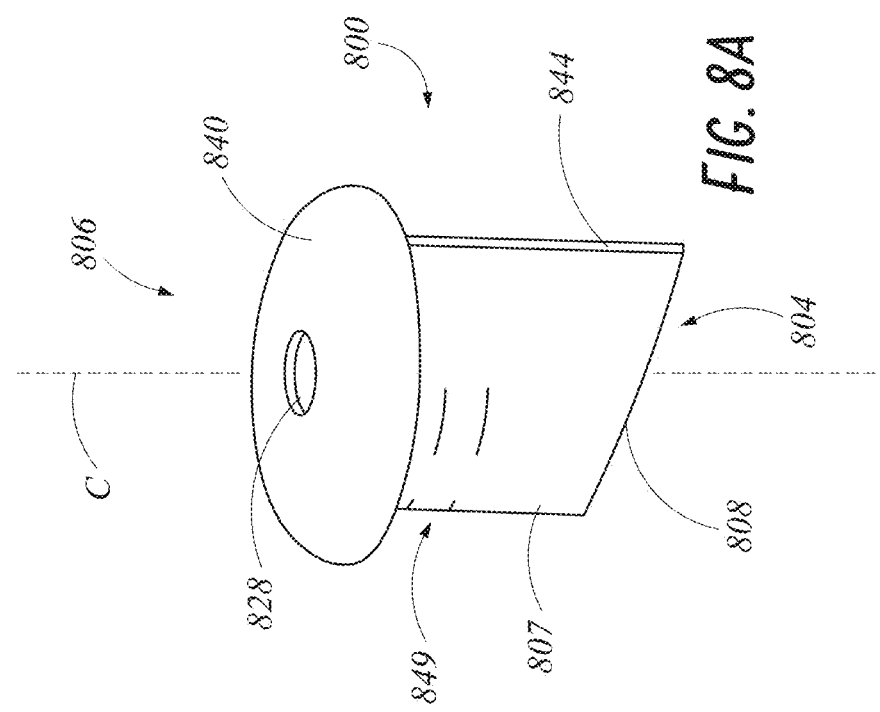

FIG. 2 shows an embodiment of a method 100 for making a patient specific insert negative 800. FIG. 8(A) shows an example of the patient specific insert negative 800. The patient specific insert negative 800 is referred to as a negative because, as discussed further below, a contoured surface 808 thereof has a shape that matches but is the opposite or is the negative of a shape to be formed on a bone graft blank B. The bone graft blank B is in turn a negative of a corresponding surface of the glenoid. The negative 800 is sometimes referred to as an "insert" herein because in certain approaches, the negative 800 is a separate component of a bone press and is inserted into the bone press prior to making the patient specific bone graft. This approach allows a bone press to be reusable while the negative 800 can be used for one specific procedure, then discarded as discussed below. However, as discussed further below, a patient specific bone press could be used, in which the contoured surface 808 of the negative 800 is integrated into and may not be inserted into nor removed from a bone press.

FIG. 2 shows a method that can be performed by or at the direction of a manufacturer of prosthetic joint components. In a step 104 three dimensional spatial location information of a bone portion of a joint is obtained. Any suitable technology can be used to obtain the spatial location information. For example, one or more imaging technologies such as CT scanning, X-rays imaging or the like can be used to generate spatial location information. A mechanical device, such as a profilometer could be used to generate spatial location information without imaging. Three dimensional spatial location information can be obtained as one part of a broader process for characterizing the bone portion to determine how to treat the patient. For example, in the case of performing a shoulder replacement, a degree of retroversion may be determined to assess whether to perform an anatomical shoulder replacement (FIG. 1A) or a reverse shoulder replacement (FIG. 1).

Figure 6:
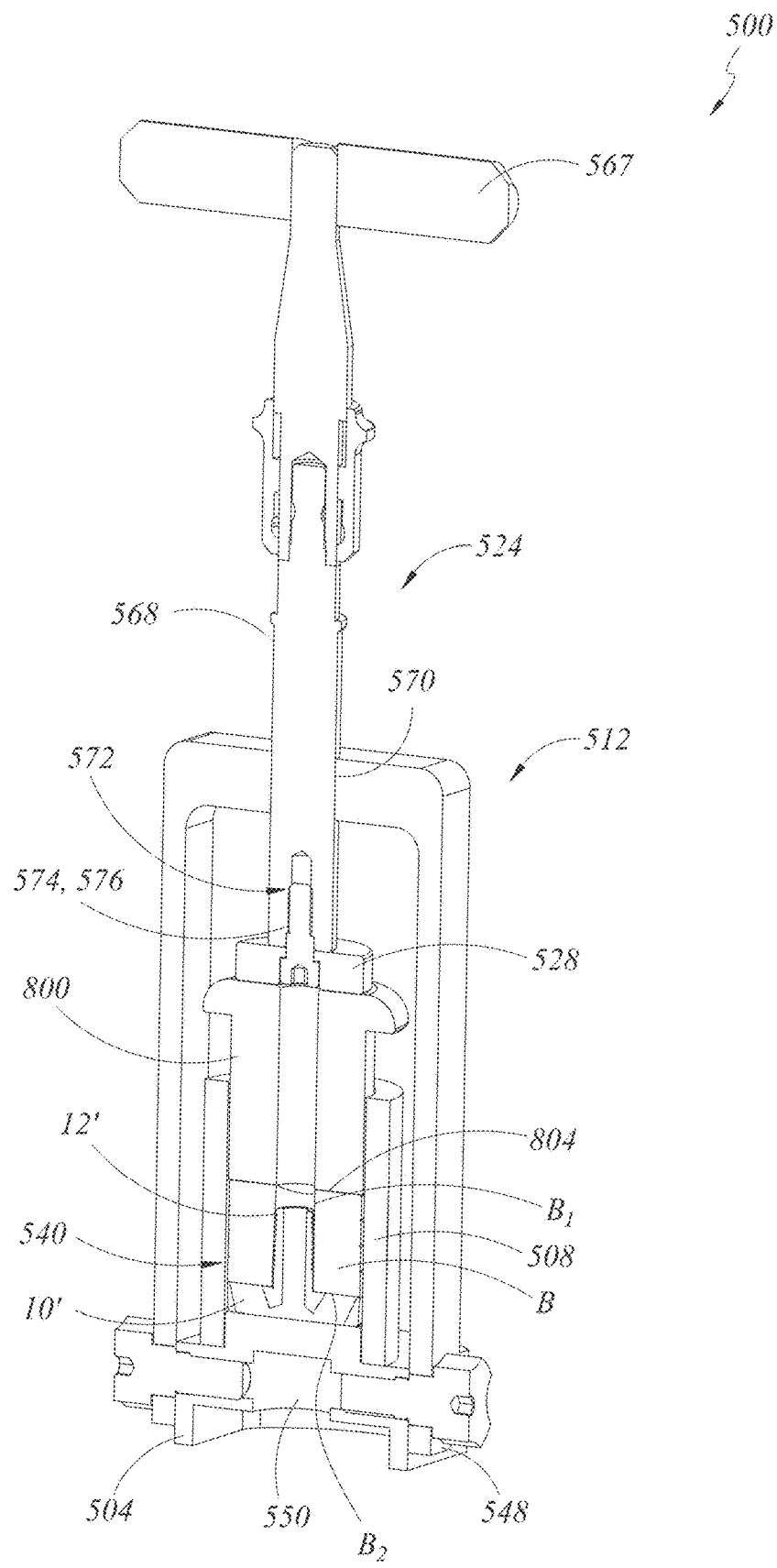
FIGS. 6 and 6A are cross-sectional view of two embodiments of the bone press of FIG. 5 taken at section plane 6-6.
Figure 7A:
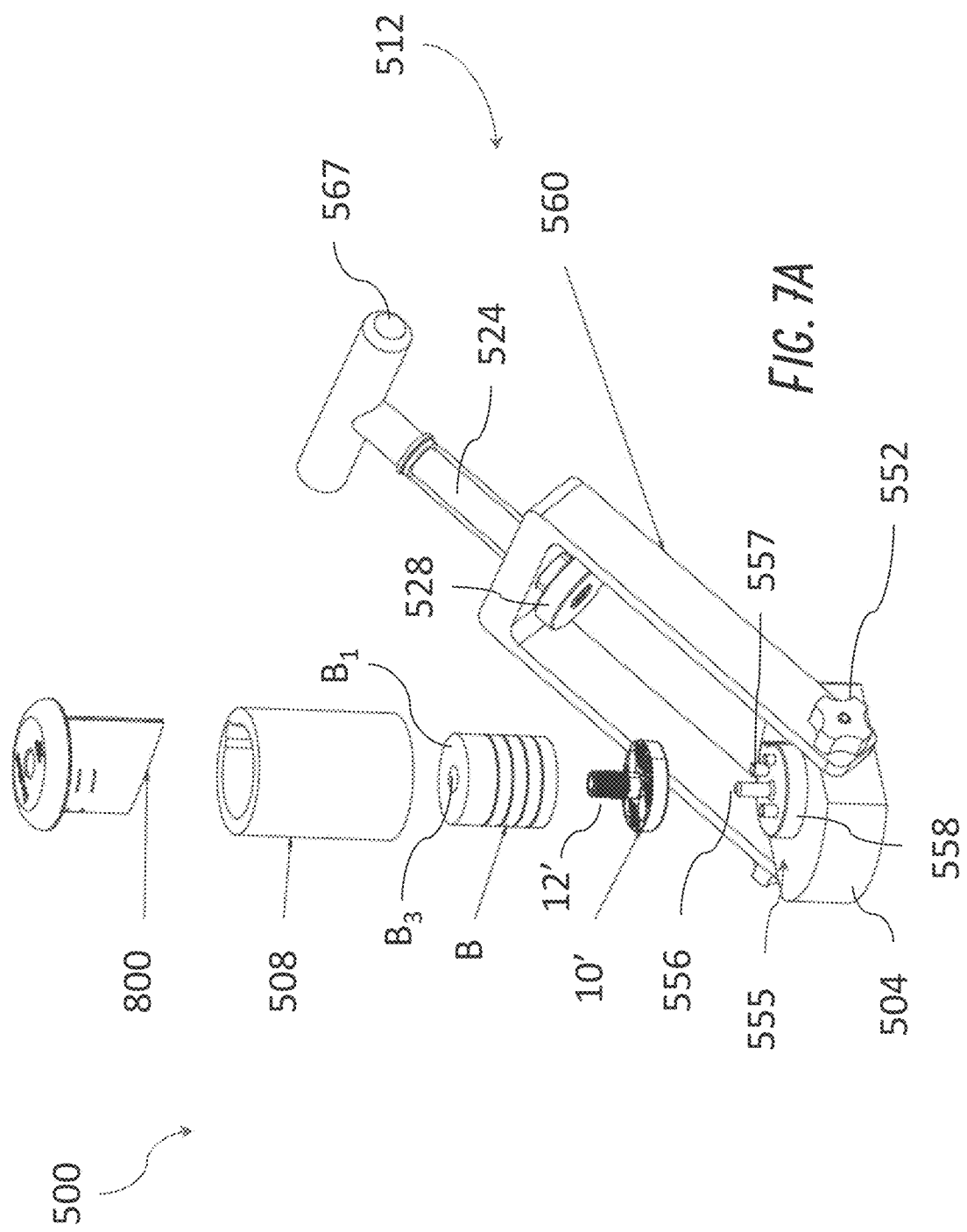
FIG. 7(A) is a partial exploded view of the bone press of FIG. 5, with a bone graft blank, and a glenoid baseplate removed from the bone press.

In a step 108, the patient specific insert negative 800 is formed. As discussed above, the negative 800 is configured with a contoured surface 808 to be an opposite of the bone graft to be formed in a bone press. The shape of the contoured surface 808 can be derived from the information concerning a bone portion that was characterized in the step 104. Therefore the step 108 can include shaping a first side 804 of the negative 800 based upon the three dimensional information. The patient specific insert negative 800 is configured to be advanced into engagement with a side of a bone graft blank B as shown in FIGS. 6 and 7(A). As discussed in more detail below, the bone graft blank B includes a volume, e.g., a cylinder or a plurality of pieces, of bone matter that does not necessarily match the shape of the glenoid surface or other bone portion analyzed in connection with step 104. In certain methods, the shape of the bone graft blank B is altered by being compressed against the negative 800 in a bone press. The negative 800 thus must be sufficiently stiff to retain the shape that is based upon the three dimensional information obtained in the step 104.

FIGS. 8(A) and 8(B) show embodiments of patient specific insert negatives 800, 800'. The insert negatives 800, 800' includes the first side 804 configured to change a generic shape of a surface of the bone graft blank B or other bone material into a patient specific shape as discussed further below. The insert negatives 800, 800' also include a second side 806, 806' opposite the first side 804. The insert negative 800, 800' also includes a peripheral surface 807 that extends between the first side 804 and the second side 806, 806'. The first side 804 can includes a contoured surface 808. The contoured surface 808 can have a first portion 812 that corresponds to a portion of bone to be augmented and a second portion 816 (best seen in FIG. 8(B), but corresponding surfaces could be provided in the embodiment of FIG. 8(A)). The second portion 816 can be configured to be mated with a portion of a bone that is to be augmented differently. The second portion 816 can be configured to be mated with a portion of a bone that is to be augmented by a lesser amount than the portion to which the first portion 812 of the contoured surface 808 is to be mated to.

As discussed above, the surface 804 is an opposite of or a negative of the surface to be created on the bone graft blank B. Accordingly, the second portion 816 which is configured to form the zone to provide lesser augmentation on the bone graft blank B extends away from the second side 806, 806' by a first amount. The first portion 812 which is configured to form a zone of greater augmentation on the bone graft blank B extends away from the second side 806, 806' by a second amount less than the first amount which is provided in the second portion 816. In one embodiment, the second portion 816 comprises a planar surface disposed in a plane that is perpendicular to a direction of compression C in a bone press. The direction of compression C can be generally along an axis extending through a central aperture 828 of the patient specific insert negative 800, 800'. The first portion 812 can be a planar portion that is disposed along a plane that is oriented at an acute angle to the axis C. The second portion 816 can be inclined toward the second side 806. The first portion 812 can have a boundary contiguous with the second portion 816 and can be spaced away from the plane of the second portion at locations away from the contiguous boundary. An advantage of providing two planar portions is that it enables the surgeon to perform two reaming steps to create two planar bone surfaces to which planar surfaces of a patient specific bone graft formed by the negative 800 can be mated.

One skilled in the art will recognize that more complex shapes can be formed by forming the first and second portion 812, 816 with complex geometries or by providing more portions on the first side 804 resulting in a more complex contoured surface 808. The advantages of more complex contoured surfaces include allowing the patient specific bone graft to more closely conform to the patient's natural anatomy. This can allow the surgeon to modify the bone to a lesser extent or even to just apply the patient specific bone graft to the glenoid without much or any modification.

To achieve more complex configurations, the contoured surface 808 can be based on three dimensional spatial location information obtained in the step 104 of FIG. 2. The patient specific insert negative 800 is configured to be mounted on or in a bone press, for example as described below. The bone press and the patient specific insert negative 800, 800' cooperate to shape the volume of bone material, which can be formed as a bone graft blank, as discussed below, upon application of pressure in the bone press.

The second side 806' is configured to mate with a bone press as discussed in greater detail below in connection with FIGS. 9-11E. The second side 806, 806' can have a surface 840 for engaging a surface of a compression plate 644 of the bone press 600. The compression plate 644 can include a surface oriented perpendicular to a direction of advance of the compression plate 644 in the press 600, which generally corresponds to the axis C. The second side 806' can also be configured with a keyed projection 844'. The keyed projection 844' can be configured to be received in a slot 657 of the bone press 600 of FIGS. 9-11E or in a slot 580A of the compression plate 528A of the bone press 500A of FIG. 6A. A keyed interface between the keyed projection 844 and the slot 657 (see FIG. 11(C)) provides a secured interface between the negative 800 and the bone press 600. The projection 844 and the slot 657 retain the insert negative 800 in a fixed rotational position. The fixed rotational position prevents rotation of the first surface 804 relative to an opposing surface of the bone graft blank B as discussed further below.

The second side 806 of the insert negative 800 can include a generally flat surface 840 although it may be rounded toward the periphery. In one embodiment, the insert negative 800 includes a keyed projection 844 that extends along the peripheral surface 807. The projection 844 can extend laterally into a longitudinal channel 580 discussed in more detail below. The peripheral surface 807 can include indicia 849 that are useful in confirming a degree of compression of the bone graft blank B as discussed further below. The indicia 849 are patient specific in that they may provide a relationship between the surfaces 812, 816 and a degree of compression due to movement of the surfaces in a bone press as discussed further below.

Further features that are convenient for integrating the patient specific bone insert negative 800 into a bone press are discussed below in connection with the bone press 600.

The method of FIG. 2 can advantageously be performed in a number of different settings. For example, a special facility can be used to form the patient specific insert negative 800. The insert negative 800 will be subject to high compression, e.g., pressures and forces, in some embodiments. The insert negative 800 will be formed of a material that will not yield under such conditions. Suitable materials include one or more of stainless steel, maraging steel, cobalt chromium, inconel, nickel alloys, aluminum, titanium, PEEK, and other polymers.

In one process flow, step 104 is performed at an imaging center that can be run by the surgeon or at a separate facility. Data generated in the step 104 can be transmitted by any means to a manufacturing facility that can create the insert negatives. In another approach, the step 108 can be performed with equipment that could be located in a factory or in a surgeon's facility. For example, direct laser metal sintering and other three-dimensional printing technologies could be adapted to be deployed in either setting to form the patient specific insert negative 800 in the step 108.

Figure 3:
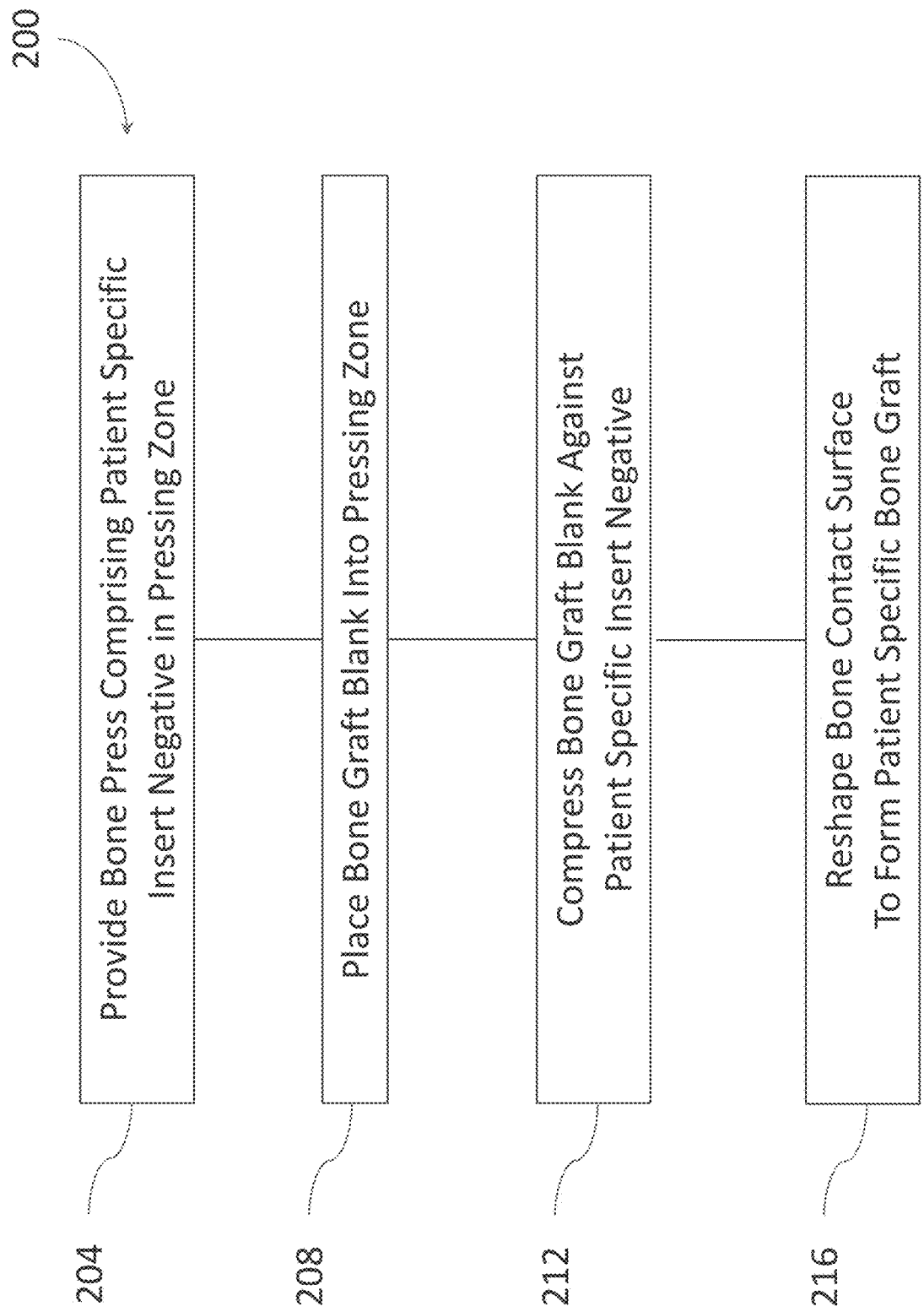
FIG. 3 illustrates a method of forming a patient specific bone graft, the graft being adapted for use in a joint replacement or repair procedure.

FIG. 3 illustrates another method 200 that can be performed by an implant manufacturer or a surgeon. The method 200 will be discussed in connection with certain features of a bone press 500, shown in FIGS. 5-7E. However any other bone press compatible with the method could be provided, including any of the bone presses described herein. In one approach, the method 200 is performed by the surgeon or surgical staff or under a supply agreement between the surgeon and a third party.

In a step 204 the bone press 500 is provided. The bone press 500 is provided with the patient specific insert negative 800. The patient specific insert negative 800 can be produced by the method 100 or otherwise. The negative 800 can be produced by a third party and supplied to the party performing the method 200.

The patient specific insert negative 800 can be provided in a pressing zone 540 of the bone press 500. The pressing zone 540 includes a volume that is contained within structures of the bone press 500. For example, as discussed below the bone press 500 includes a base 504, a housing 508, and an actuator 512. The pressing zone 540 is defined in the bone press 500 between ends thereof by the base 504 and the patient specific insert negative 800. An outer bound of the pressing zone 540 is defined by an inside surface 510 of the housing 508. The housing 508 can be a solid cylindrical sleeve. In some embodiments, the housing 508 is clear or has a clear portion such that compression of the bone graft blank B therein can be observed by the user. The housing 508 can have an inner diameter that is about the same dimension as an outer diameter of a cylindrical bone graft blank B. In one embodiment, the bone graft blank B is about 25 mm in diameter and the inner diameter of the housing 508 is about 25 mm. In another embodiment, the bone graft blank is about 25 mm in diameter and the inner diameter of the housing 508 is about 26, about 27, about 28, about 29, or about 30 mm. In another embodiment, the inner diameter of the housing 508 can be 20-30% larger than the diameter of the bone graft blank B.

The housing 508 could be formed with indicia instead of or in addition to the insert negative 800 to provide feedback to the user as to the degree of compression of a bone graft blank in the bone press 500.

In step 208 a bone graft blank B is placed in the pressing zone 540. Although the bone graft blank B can be placed directly on the base 504, in certain variants of the method another structure can be placed on the base 504 and that other structure can define an end or a portion of the pressing zone 540.

FIGS. 5-7E illustrate methods when the glenoid component 10' optionally is placed on the base 504. In a modified embodiment, the methods of FIGS. 5-7E can be performed without the glenoid component 10' placed on the base 504, e.g., with a bone graft blank placed directly on the base 504. The glenoid component 10' defines a portion of the pressing zone 540. In particular, the medial face 34 of the glenoid component 10' can form an end of the pressing zone 540. As discussed above, the glenoid component 10' has anchor member 12'. The opposing face 32 provides an end of the pressing zone 540. In one variation of the method 200, the anchor member 12' is disposed in the pressing zone 540. The step 208 can involve placing a cylindrical bone graft blank B over the anchor member 12'. In this variation, the anchor member 12' is radially inward of and is surrounded by the bone graft blank B. In this variation, the bone graft blank B is radially inward of and is surrounded by the housing 508. The pressing zone 540, e.g., the space where compression of the bone graft blank B occurs, can be at least partially defined between the anchor member 12' and the housing 508.

The method 200 can continue with a step 212 in which the bone graft blank B is placed under compression. The compression can be due to pressure being applied to medial and lateral ends $B_1$, $B_2$ of the bone graft blank B. The compression can be due to a force being applied to medial and lateral ends $B_1$, $B_2$ of the bone graft blank B. Compression can be applied in the pressing zone 540 by providing relative motion between the patient specific insert negative 800 and the base 504 or a portion of the base 504 or of a component coupled with the base.

The step 212 can involve actuating the patient specific insert negative 800 and thereby moving the negative 800 toward the cover 504 as indicated by an arrow A in FIG. 6. In the bone press 500, the patient specific insert negative 800 is moved toward the base 504 by the actuator 512. The patient specific insert negative 800 is moved by rotating a screw member or ram 524 to advance a compression plate 528 toward the base 504. The compression plate 528 can include a rigid plate configured to couple with the patient specific insert negative 800.

Other structures that could be used to move the patient specific insert negative 800 into compression with the bone graft blank B can include a lever arm (discussed below in connection with 12-14B), a pneumatic mechanism, or other similar mechanisms. The actuator 512 can be hand operated or automatically driven. The actuator 512 can have a handle with an arcuate form between lateral ends thereof to conform to the shape of the palm of the hand of a user.

In a step 216, the bone graft blank B is reshaped to form a patient specific bone graft. For example, the compression provided in the step 212 can be continued or increased until ends of the bone graft blank B change their shape in a suitable manner. The reshaping can involve shortening the bone graft blank along the axis C by 25-75%, by 35-65%, for example by about 50%. The reshaping can include modifying a planar or irregular medial side or end $B_1$ of the bone graft blank B to have a specified profile. For example, as discussed above the first side 804 of the insert negative 800 can have a profile that matches a glenoid shape or a shape to which the glenoid will be modified in a surgical procedure. In one example, the glenoid is to be reamed to planar faces that are disposed along a contiguous boundary but angled to one another. In such case, the insert negative 800 is formed to have a shape that matches that of the glenoid or the shape to which the glenoid is to be modified. In the step 216, the insert negative 800 can have two angled faces on the medial side as shown in FIG. 8(B). The compression can be continued or increased by continuing to move the insert negative 800 toward the base 504 after initial contact is made between the insert negative 800 and the bone graft blank B. Such movement can continue for 10-20 mm or for up to about 50% or even as much as 60%, 65%, or even 70% of the initial uncompressed length of the bone graft blank B. The step 216 causes the bone graft blank B to be compressed and to conform to a surface of the negative 800 and generally to irreversibly deform so as to hold the shape once compression is removed. This is not an elastic deformation only where the bone springs back to its initial shape once compression is removed, though some limited recoil may occur.

Figure 4:
FIG. 4 illustrates another method of forming a patient specific bone graft, the graft being adapted for use in a joint replacement or repair procedure.

FIG. 4 illustrates a method 300 in which three dimensional spatial location information is obtained and a patient specific bone graft is produced. This method can be conducted by or under the direction of a surgeon or by or under the direction of a third party, such as an implant manufacturer. The method 300 includes a step 304 in which three dimensional spatial location information is obtained. The step 304 can be similar to the step 104, such as including the conducting of a CT scan or x-ray of a relevant portion of a patient's bone or joint.

In a step 308 a prosthesis component, such as the component 10', optionally is placed in a bone press. With reference to FIG. 7A, the component 10' can be placed directly onto the base 504 of the bone press 500. In another variation, the component 10' can be placed on an impactor 690. Thereafter, a portion of the impactor 690 and the prosthesis component can be placed in the bone press together. In another variation, the component 10' is not placed in the bone press 500 during a method of forming a patient specific bone graft.

In a step 312, a bone graft blank, such as blank B, is placed in the bone press 500. FIG. 6 shows that the bone graft blank B can be placed in the bone press 500 in a location between the base 504 and the patient specific insert negative 800. In one method, an end or lateral side $B_2$ of the bone graft blank B faces toward the base 504 and an end or medial side $B_1$ faces toward the patient specific insert negative 800. As discussed above, the bone graft blank B can take any suitable form. In some cases the bone graft blank B is a cylinder of bone with the sides $B_1$, $B_2$ being generally flat opposing sides and having a generally circular body extending therebetween. The bone graft blank B can be obtained from a resected portion of the humerus or from another bone segment. As a result, in some cases, the bone graft blank B can be more irregularly shaped as a result of being cut during a procedure from the patient undergoing shoulder replacement. The bone graft blank B also can include two or more pieces that are placed into the housing 508 and later compressed into a single graft.

In one technique, the prosthesis component 10' with the bone graft blank B mounted thereon is placed in a bone press, such as the press 500. As shown in FIG. 7(A), for example, the component 10', which has an anchor member 12', can have a central lumen $B_3$ of bone graft blank B placed thereover. The lumen $B_3$ can be sized to permit the bone graft blank B to be slipped over the anchor member 12'. So, in one variation the step 312 includes providing relative motion between the anchor member 12' of the component 10' and the bone graft blank B such that the anchor member 12' is moved into the lumen $B_3$. After the bone graft blank B is mounted on the prosthesis component 10', the component and the blank can be placed into the bone press 500. In a variation, the prosthesis component 10' is not placed in the bone press 500. The blank B can be placed directly onto the base 504 or another component of the bone press 500.

FIG. 6 shows that when the bone graft blank B is placed in the bone press 500 the medial side $B_1$ is adjacent to the patient specific insert negative 800. In one approach no components are placed between the medial side $B_1$ and the first side 804 of the negative 800. Direct contact can be provided between the medial side $B_1$ and the first side 804 of the negative 800. Direct contact allows the surface profile of the medial side $B_1$ and the first side 804 to be provided on the bone graft blank B as discussed further below.

Figure 10:
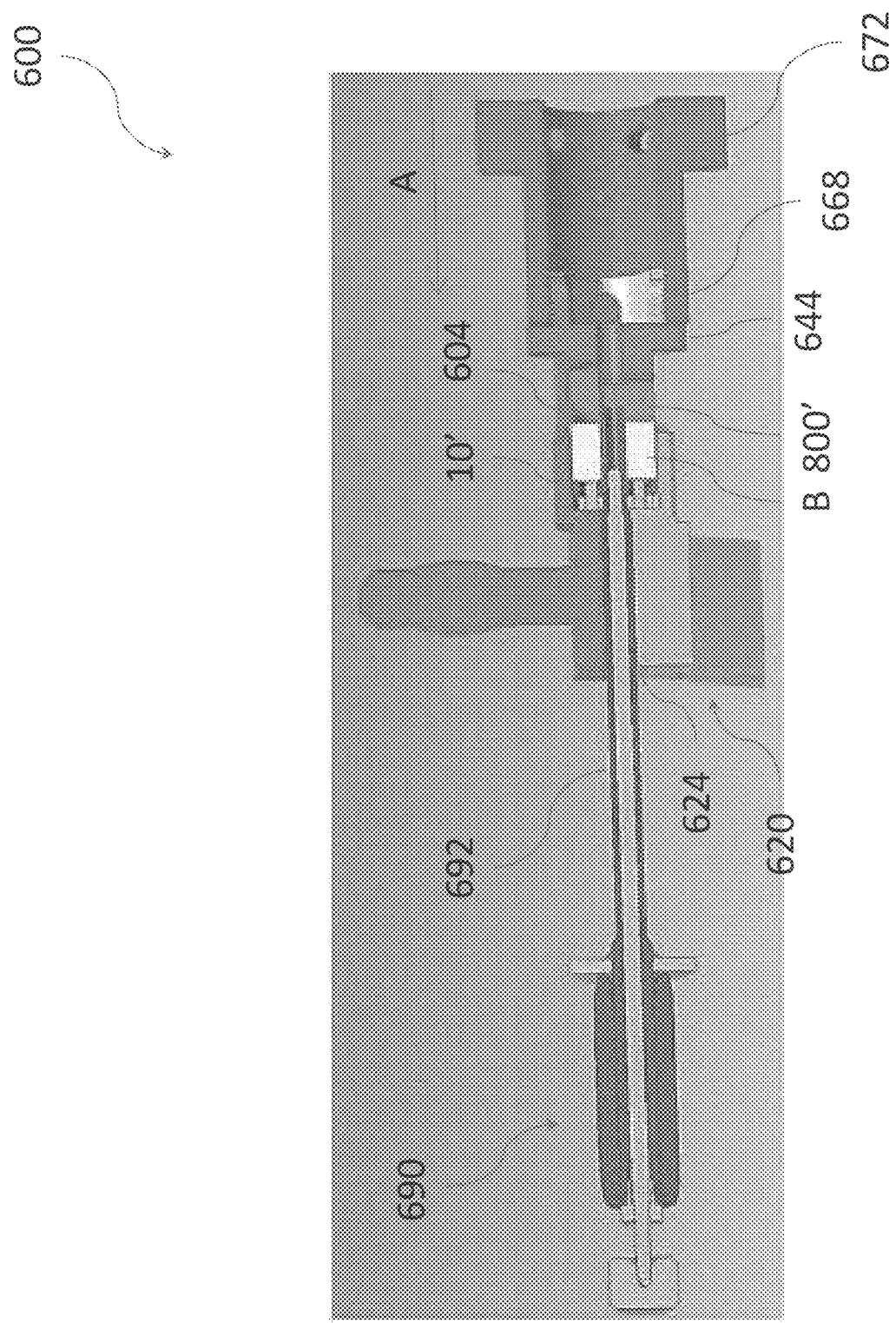
FIG. 10 is a cross-section of the bone press of FIG. 9 taken along the plane 10-10.

In a step 316 the bone graft blank B is compressed in the bone press. FIG. 6 shows that the bone graft blank B is compressed in the pressing zone 540 between the patient specific insert negative 800 and the component 10'. More generally, the bone graft blank B is compressed between the patient specific insert negative 800 and the base 504. The compression provided in the step 316 is initially axial compression. Axial compression is along the direction of the arrow A (FIG. 10). After an initial level of compression, the bone graft blank B may expand transverse to the direction A to some extent. However, the pressing zone 540 of the bone press 500 is enclosed by the housing 508. So expansion transverse to the lumen $B_3$ is limited. The bone graft blank B is disposed between the anchor member 12' and the housing 508. This configuration can provide compression in the transverse direction.

In a step 320 the bone graft blank B is reshaped. The step 320 can involve changing the length of the body of the bone graft blank B from a first length to a second shorter length, as discussed above in connection with the method of FIGS. 3. The step 320 can involve increasing the outer profile of the bone graft blank B, for example from a first radius to a second larger radius. If the shape of the medial side $B_1$ of the bone graft blank B has not been modified upon compression in the step 316, the step 320 can involve changing the side $B_1$ to a shape matching, but a negative of, that of the bone to which the bone graft blank B will be mated after it is changed into a patient specific bone graft. The step 320 causes the bone graft blank B to be compressed and conformed and generally to irreversibly deformed so as to hold the shape once compression is removed. This is not an elastic deformation only where the bone springs back to its initial shape once compression is removed, though some limited recoil may occur.

Following the method of FIGS. 3 and 4 the bone graft that is shaped in the bone press 500 (or other bone press) can be removed. If the initial diameter of the bone graft blank B is similar to the inner diameter of the housing 508 an ejector tool can be used to push the bone graft out of the housing 508. The ejector can include an elongate solid rod with a handle at one end and a disk or other pushing plate at the other end. The disk or pushing plate is configured to mate with and push the bone graft out of the housing 508. A kit including the bone press 500 (or other bone presses disclosed or claimed herein) can include an ejector.

Bone Graft Presses

Figure 5:
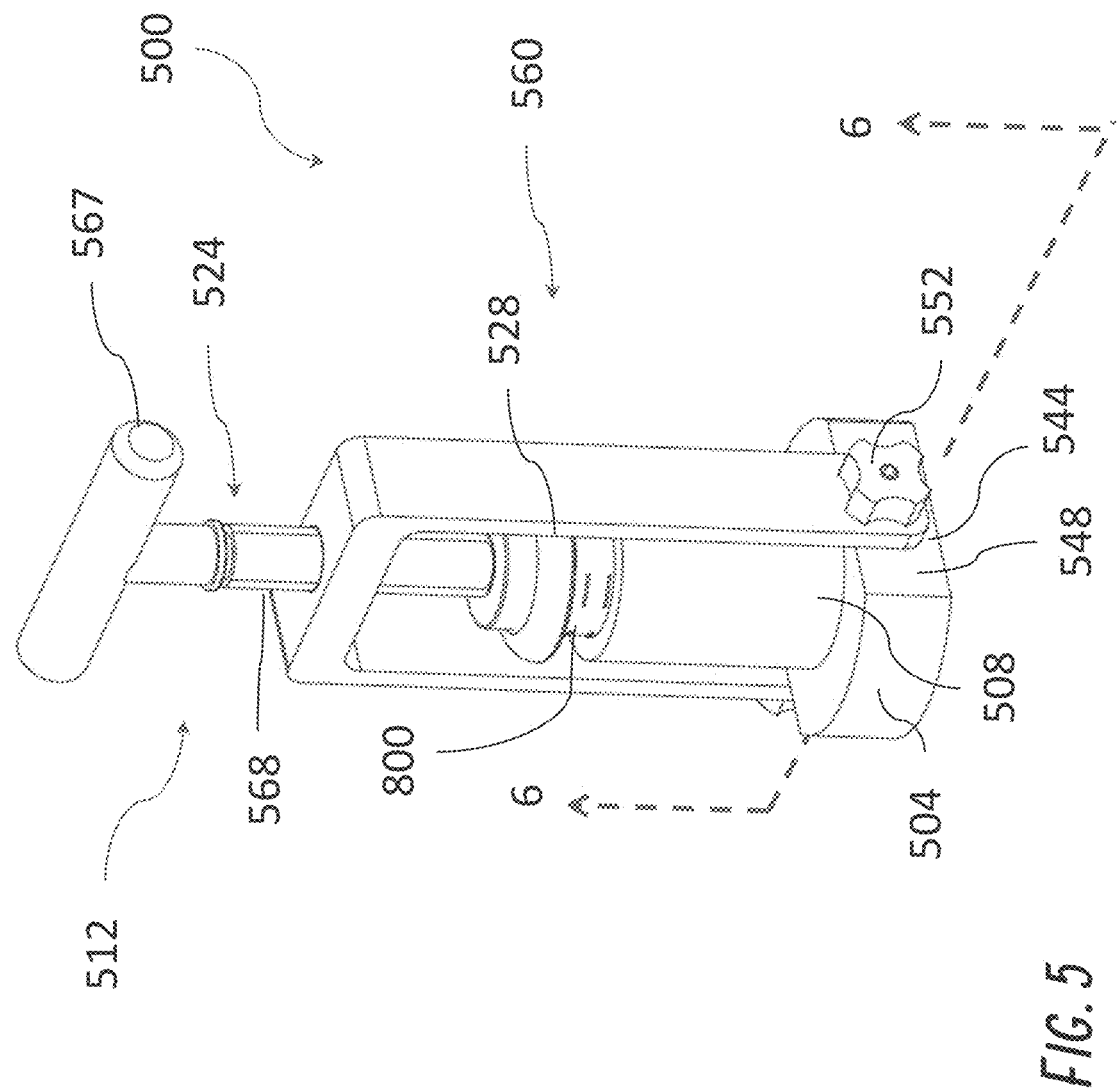
FIG. 5 is a perspective view of one embodiment of a bone press.
Figure 9:
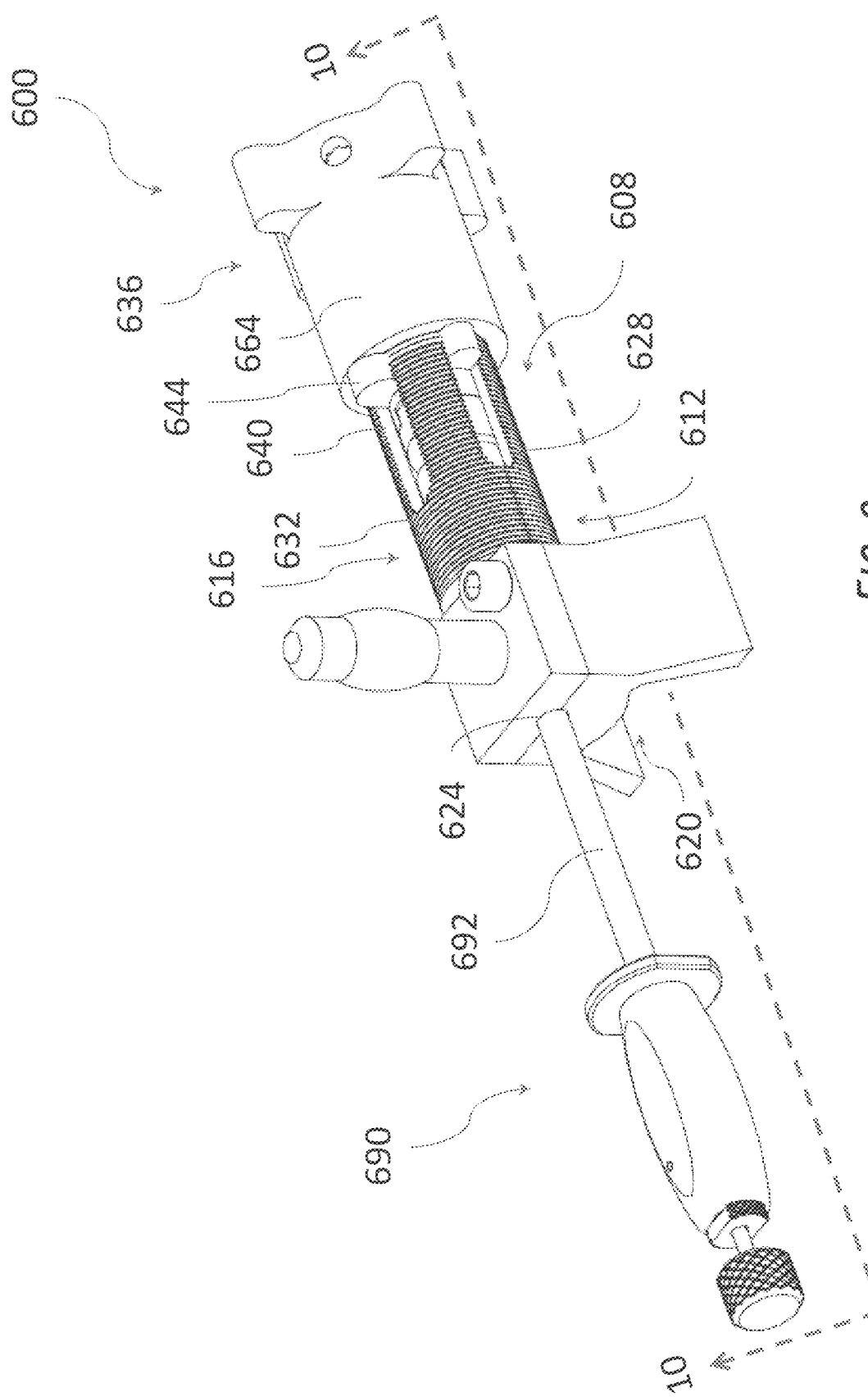
FIG. 9 is a perspective view of a second embodiment of a bone press in which an end of a baseplate impactor is disposed in a pressing zone of the bone press during the formation of the patient specific bone graft and in which compression being applied in the pressing zone by actuating a threaded coupling.
Figure 11A:
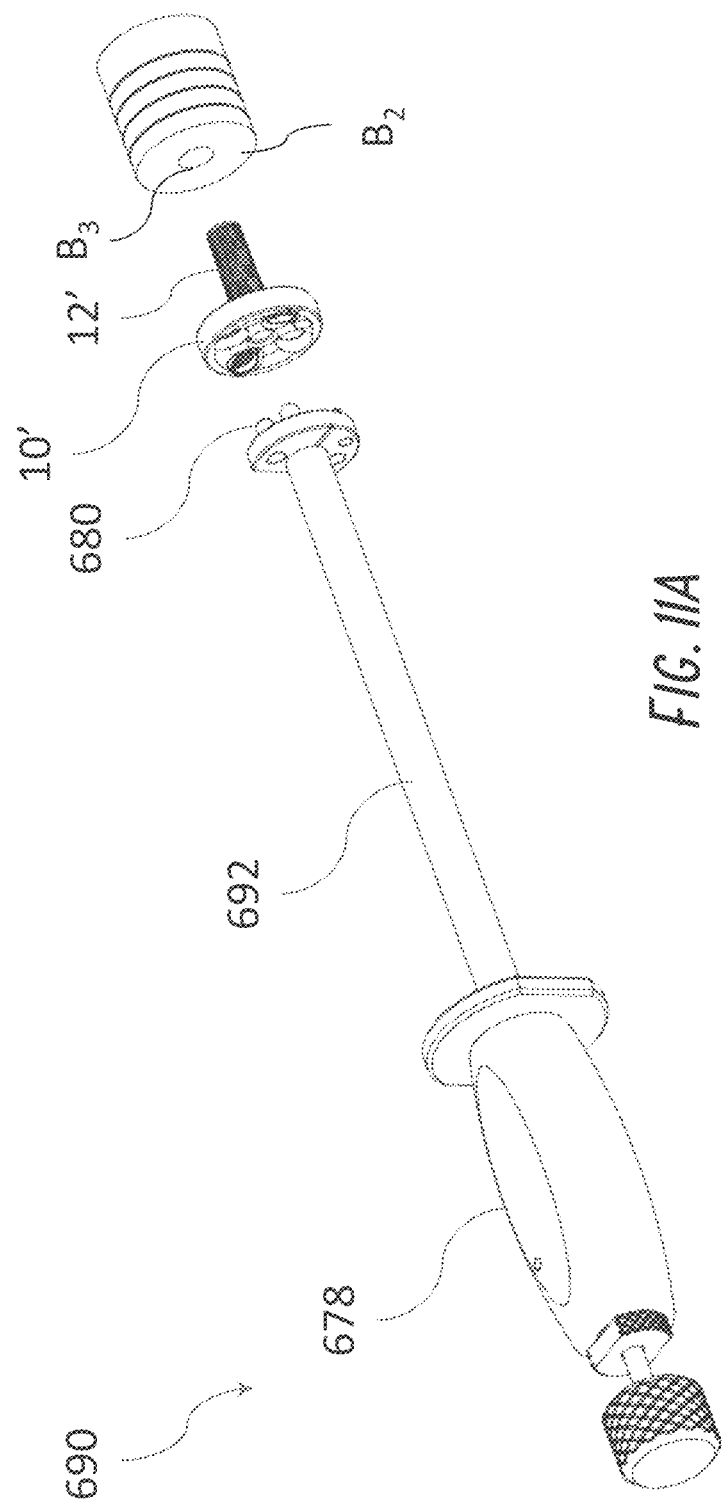
FIG. 11(A) is a partial exploded view of an impactor, a joint prosthesis component, and a bone graft blank that can be placed in a bone press to form a patient specific bone graft on the impactor.
Figure 11C:
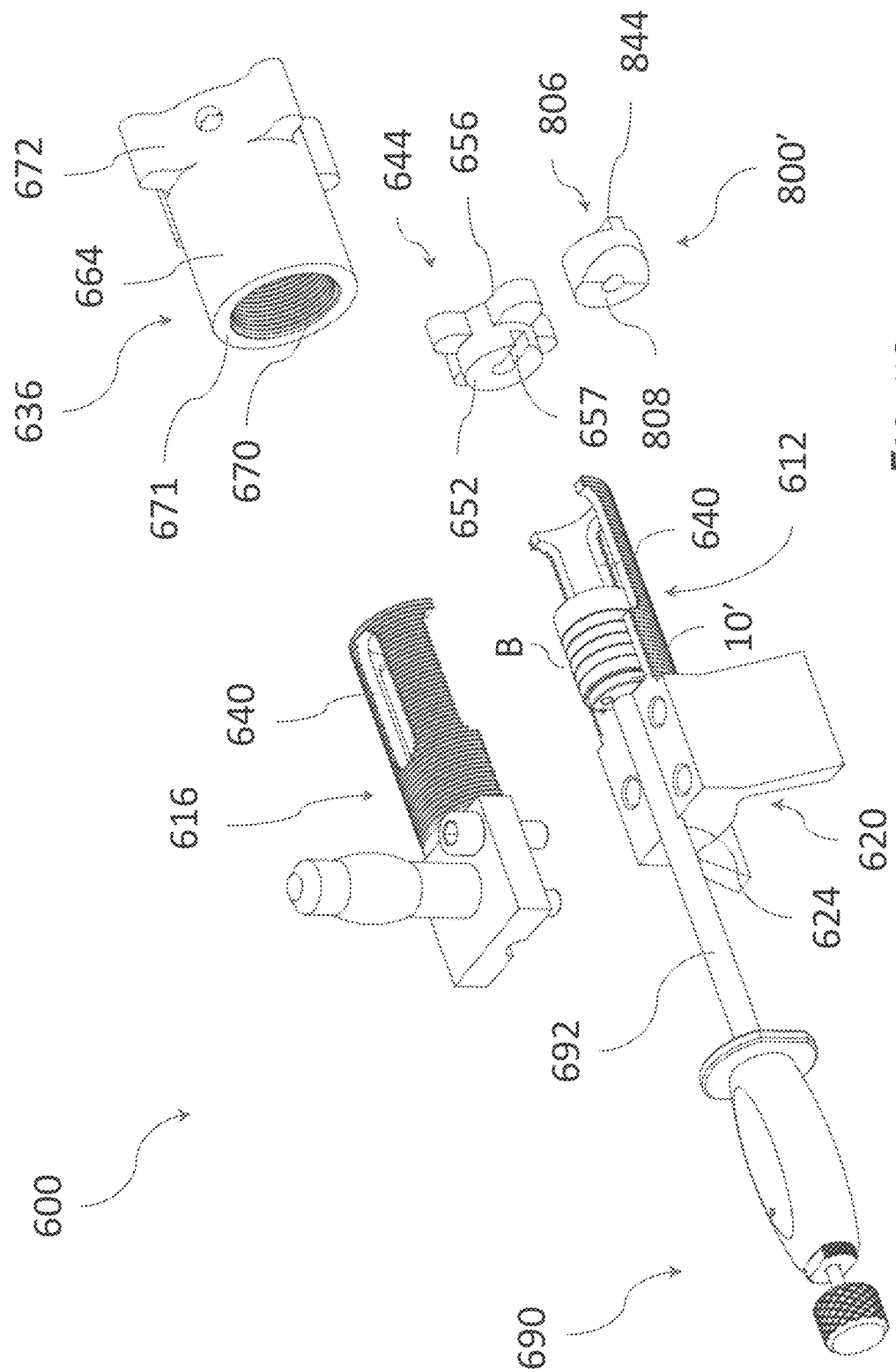
FIG. 11(C) is a partial exploded view of the bone press of FIG. 10 showing an end of an impactor, a joint prosthesis component, and a bone graft blank disposed on a surface of a structure partially forming a pressing zone.
Figure 11D:
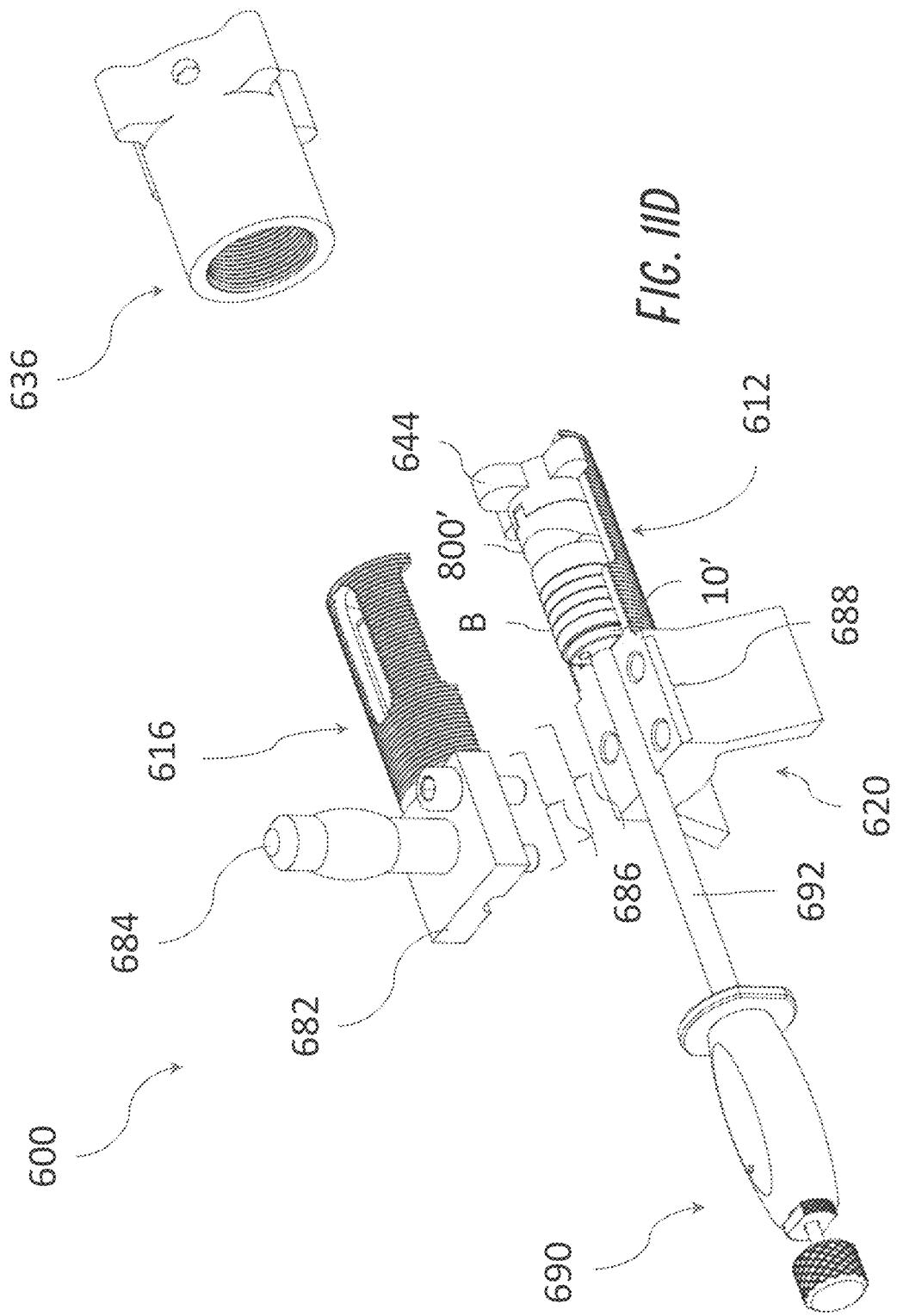
FIG. 11(D) is a partial exploded view similar to that of FIG. 11(C) showing a compression member placed on a lower shell of a base of the bone press, the lower shell partially forming a housing disposed around the pressing zone.
Figure 11E:
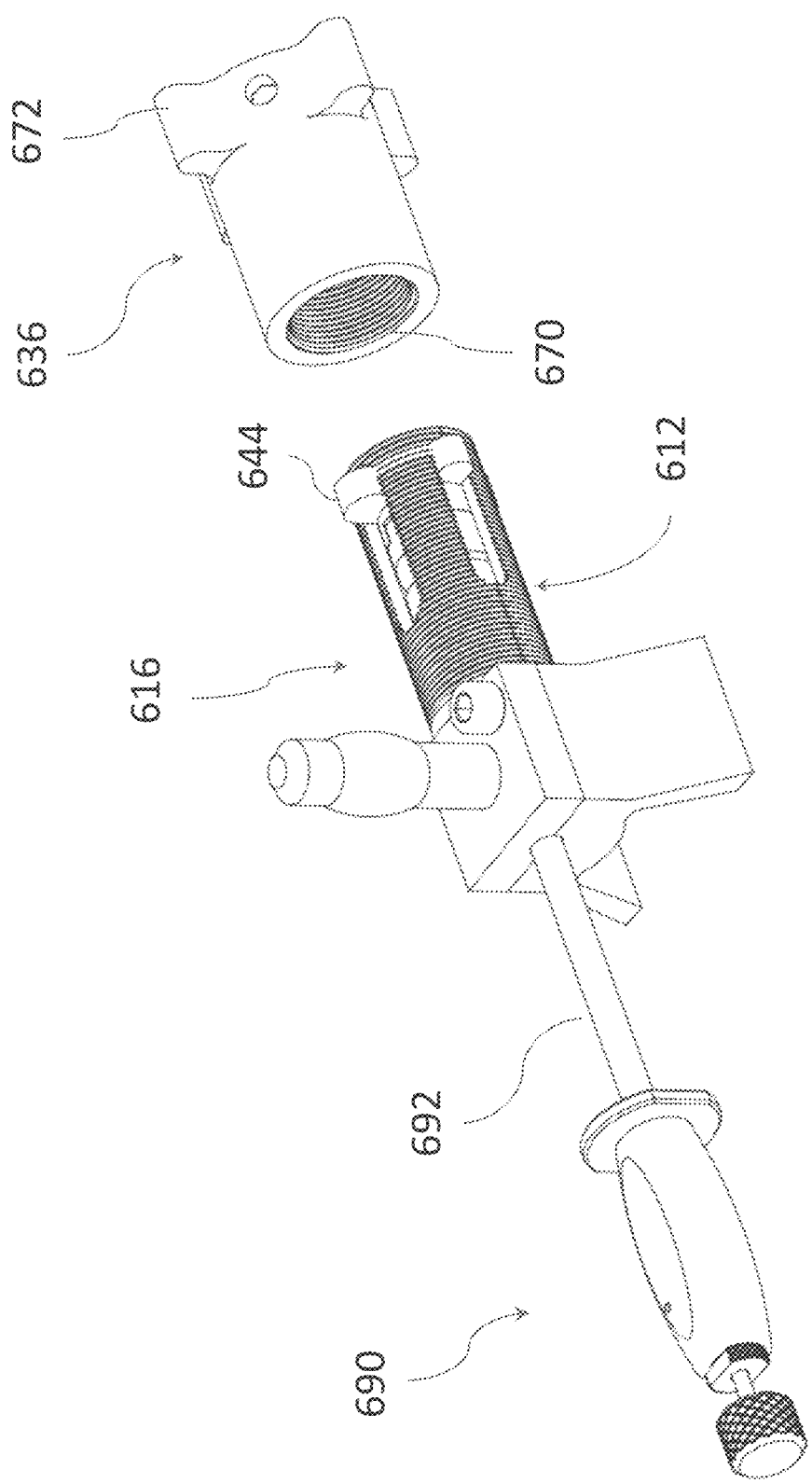
FIG. 11(E) is a partial exploded view similar to FIG. 11(C) showing an upper shell placed over the lower shell to form a housing disposed around the pressing zone.
Figure 12:
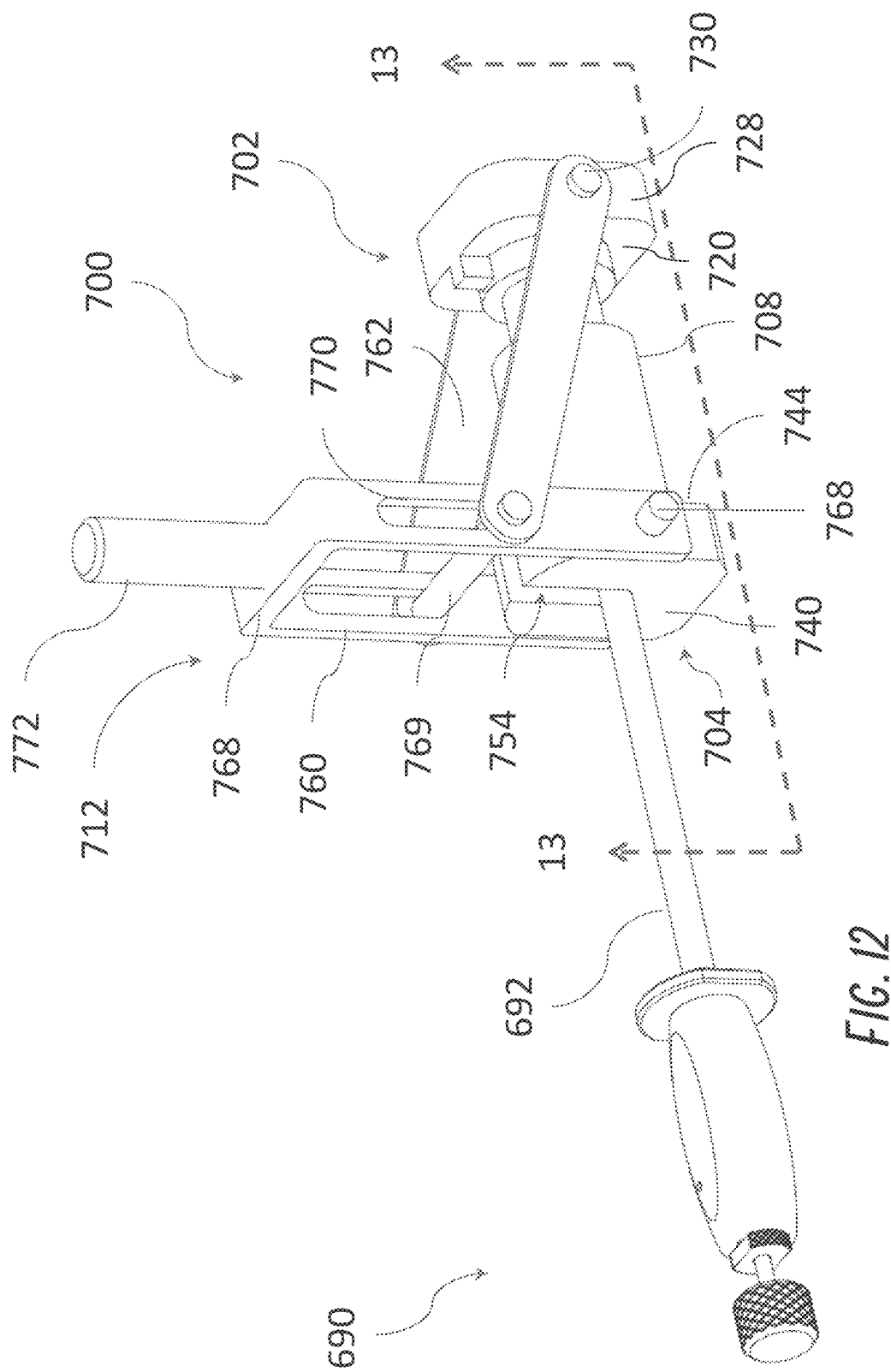
FIG. 12 is a perspective view of a third embodiment of a bone press in which a non-threaded actuator, e.g., a lever, applies compression in a pressing zone during the formation of a patient specific bone graft.

Turning now to FIGS. 5-14B a variety of bone graft presses will be discussed in greater detail. The bone graft presses of these embodiments can be hand operated. FIGS. 5 and 9 illustrate bone presses in which an actuator is provided that includes a threaded connection. FIG. 12 shows a bone press that includes a single motion actuator, e.g., a non-threaded actuator, e.g., an actuator with a lever, to provide compression of a bone graft blank B. The bone graft presses can be used to form a patient specific bone graft directly on a component to which the bone graft is to be coupled. FIGS. 5-7(E) illustrate bone presses that form a patient specific bone graft directly on a glenoid baseplate to be coupled with an impactor or other surgical tool after the patient specific bone graft is formed. FIGS. 9-14(B) show a bone press that permits an impactor to be coupled with a glenoid baseplate prior to the formation of the bone graft in the bone press such that the baseplate and the bone graft are ready to be implanted immediately after the bone graft is removed from the bone press.

FIGS. 5-7(E) illustrate the bone press 500 in greater detail. The bone press 500 is configured to receive the bone graft blank B and the prosthesis component 10' together in the pressing zone 540. In other embodiments the bone graft blank B could be placed the pressing zone 540 without the component 10'. The actuator 512 of the bone press 500 includes a threaded mechanism for advancing the actuator 512 toward the base 504 which allows for a large amount of compression, if desired.

FIG. 5 shows that the base 504 can comprise a plate-like configuration. That is, a lower surface 544 can be planar in shape allowing the base 504 to rest on a table or other flat surface in use. The lower surface 544 would be the bottom of the bone press 500 in such arrangements with an upper part of the actuator 512 being the top of the bone press. The bone press also can include two side surfaces 548 to which the actuator 512 is coupled. The side surfaces 548 can include threaded apertures 550 to which threaded members 552 of the actuator 512 can be coupled (see FIG. 6). In one embodiment the threaded apertures 550 comprise end portions of one elongate lumen that extends from one of the surfaces 548 to the other of the surfaces 548.

FIG. 7(A) shows that an upper surface of the base 504 can include a platform 555 configured to couple with the component 10' or other joint component. The platform 555 preferably allows the component 10' to be quickly coupled with the platform 555 to prevent rotation of the component 10' relative to the platform 555. For example a central post 556 can be provided that can be received into an aperture of the component 10'. One or more peripheral posts 557 can be provided spaced apart from the central post 556. The peripheral posts 557 also are received in apertures of the component 10'. The peripheral posts 557 prevent any torque that may be induced in the pressing zone 540 from resulting in rotation of the component 10' or from transmission of torque transferred between the upper surface 554 and the component 10' from being applied to the bone graft blank B. Providing isolation from some or substantially all such torque can be important if the material of the bone graft blank B is fragile because the goal of the bone press is to output a solid patient specific bone graft that will not crumble in subsequent using during a joint implantation procedure. The platform 555 can also be a locally elevated portion of the upper surface of the base 504. For example, upward cylindrical projection 558 can be provided on the upper surface of the base 504. The projection 558 allows the component 10' to come to rest at an elevation above a portion of the upper surface 554 located outward of the projection 558. The projection 558 can have a circular periphery with an outer radius less than the inner diameter of the housing 508 such that the housing can be advanced over the projection 558 and come into contact with the upper surface 554 at a location outward of the projection 558. This configuration allows the entire platform 555 to be received in the housing 508 during the compression of the bone graft blank B.

FIGS. 5 and 6 show the actuator 512 in more detail. The actuator 512 includes a frame 559 that provides a rigid connection to the base 504. In one embodiment the frame 559 includes two bars 560 that are pivotally connected at a first end 562 to the base 504 by the threaded members 552. The bars 560 include an elongate rigid portion that extends from the first end 562 to a second portion 564 at which the bars 560 are linked. The second portions 564 can be linked by a transverse bar 566. In some configurations, the bars 560 and the transverse bar 566 are portions of a unitary construction, e.g., they can be monolithic, they can be a single piece, and/or they can be seamless without boundaries between them. The bars 560 and the bar 566 (if present) transfer forces between the base 504 and a compression plate 528 of the actuator 512. The compression plate 528 is advanced by action of a handle 567.

FIGS. 5 and 6 show that the compression plate 528 can be placed between the handle 567 and the base 504. A ram 524 is coupled at one end with the compression plate 528 and at an opposite end with the handle 567. The ram 524 is configured to be advanced relative to the transverse bar 566, for example by a threaded connection. The ram 524 can have a threaded external surface 568 that mates with internal threads of a hole 570 formed in the inside surface of a hole formed in the transverse bar 566.

The connection between the handle 567 and the ram 524 can be any suitable connection. A suitable connection will transfer torque from the handle 567 to the ram 524 such that rotation of the handle is transferred directly into rotation of the ram. Such connection will generally prevent any relative rotation between the handle and the ram. The handle 567 can be directly coupled to the ram 524, such as by a pin or screw to assure one-to-one rotation between these components. The handle 567 and the ram 524 could be formed as a single component, e.g., be unitary in some configurations. The connection between the ram 524 and the compression plate 528 preferably is one which advancement of the ram 524 toward the base 504 is transferred one-to-one to the compression plate. The compression of the bone graft blank B that is preferred is primarily or substantially only in the axial direction. In this context, the axial direction is a direction defined along the central axis of the lumen $B_3$. The axial direction also can be defined as perpendicular to one or both of the surfaces $B_1$, $B_2$ of the bone graft blank B. To provide no or substantially no circumferential compression of the bone graft blank B the compression plate 528 is configured to remain rotationally fixed during advancement of the compression plate. Relative rotation of the compression plate 528 is provided by the connection between the plate 528 and the ram 524.

Figure 6A:
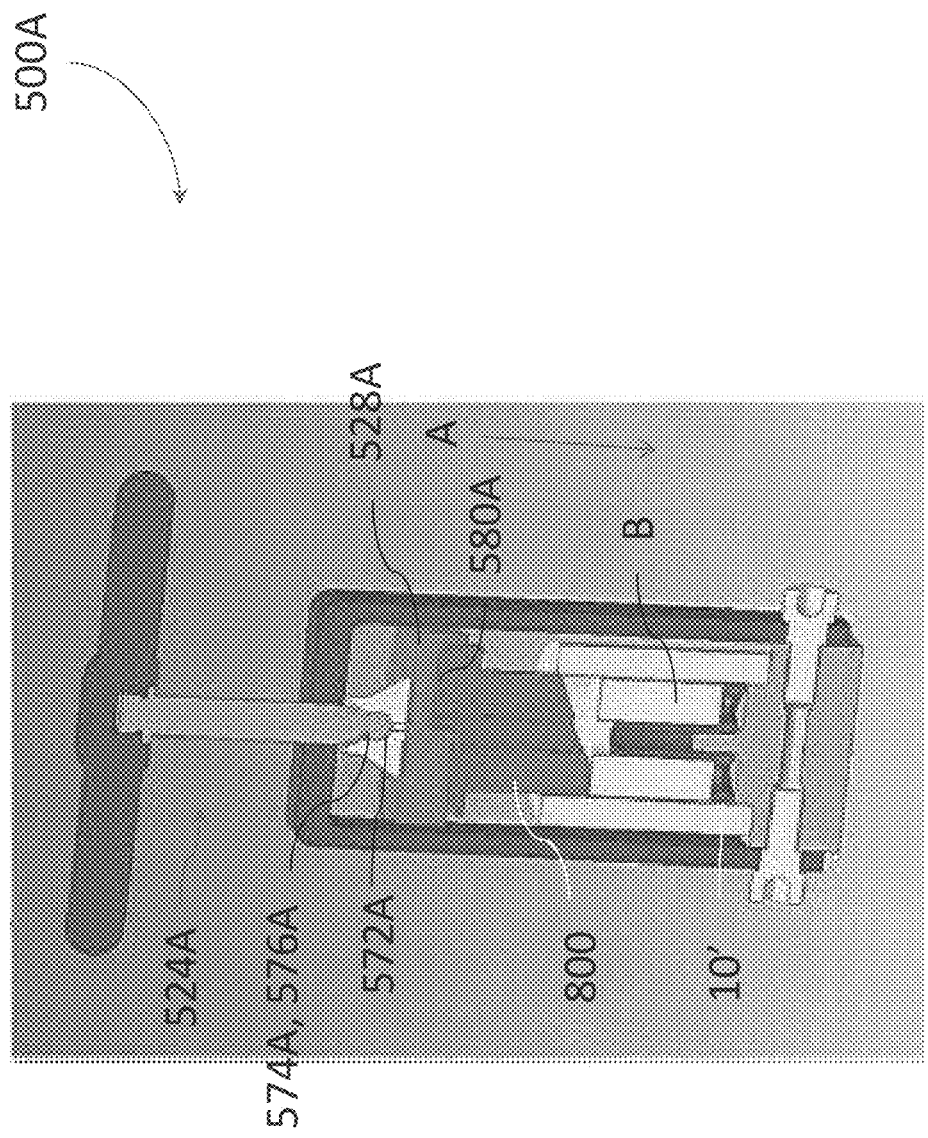

FIG. 6 shows one mechanism for providing relative rotation between the compression plate 528 and the ram 524. In particular, a coupler 572 can be provided between an upper side of the compression plate 528 and the ram 524. The coupler 572 can include a stepped cylindrical recess 574 formed in the ram 524. The recess 574 can more generally be an arcuate chamber in some embodiments. The lower end of the ram 524 can receive a pin or axle with an arcuate surface 576 defined thereon. The arcuate surface 576 can optionally be stepped and preferably has a slip fit relative to the recess 574. The coupling of the cylindrical recess 574 and the arcuate surface 576 provide for rotation of the compression plate 528 relative to the ram 524. Although shown as a pin and recess connection, the connection could be one that provides at least one additional axis of rotation FIG. 6A shows another embodiment of a bone press 500A that is similar to the bone press 500 except as described or illustrated differently. The bone press 500A has a mechanism for providing relative rotation between a compression plate 528A and a ram 524A. In particular, a coupler 572A can be provided on an upper side of the compression plate 528A. The coupler can have an arcuate chamber 574A defined therein. The arcuate chamber 574A is at least partially spherical in one embodiment. The lower end of the ram 524A can have an arcuate surface 576A defined thereon. The arcuate surface 576A can comprise an at least partially spherical surface. The coupling of the arcuate chamber 574A and the arcuate surface 576A provide for relative rotation of the compression plate 528A relative to the ram 524A. Although shown as a ball and socket connection, the connection could be one that provides relative rotation about fewer axes, e.g., about two axes. Also, the compression plate 528A can have a keyed arrangement formed thereon, as discussed further below.

FIGS. 7(A)-7(E) show how the bone press 500 is used. In FIG. 7(A), the ram 524 and the compression plate 528 are raised by actuating the handle 567 to a position spaced away from the base 504. The plate 528 can be moved as far away from the base 504 as possible, in a position that may be described as fully retracted. The threaded members 552 can be loosened if necessary to permit the actuator 512 to be moved away from the platform 555 to allow access to the platform. The component 10' or other similar component can then be placed on the platform 555. Apertures in the component can be placed over the central and peripheral posts 556, 557. In this position the component 10' is secured to the platform 555 against undesirable rotation. The base 504 is rigid and holds the component 10' against axial movement away from the compression plate 528.

Figure 7B:
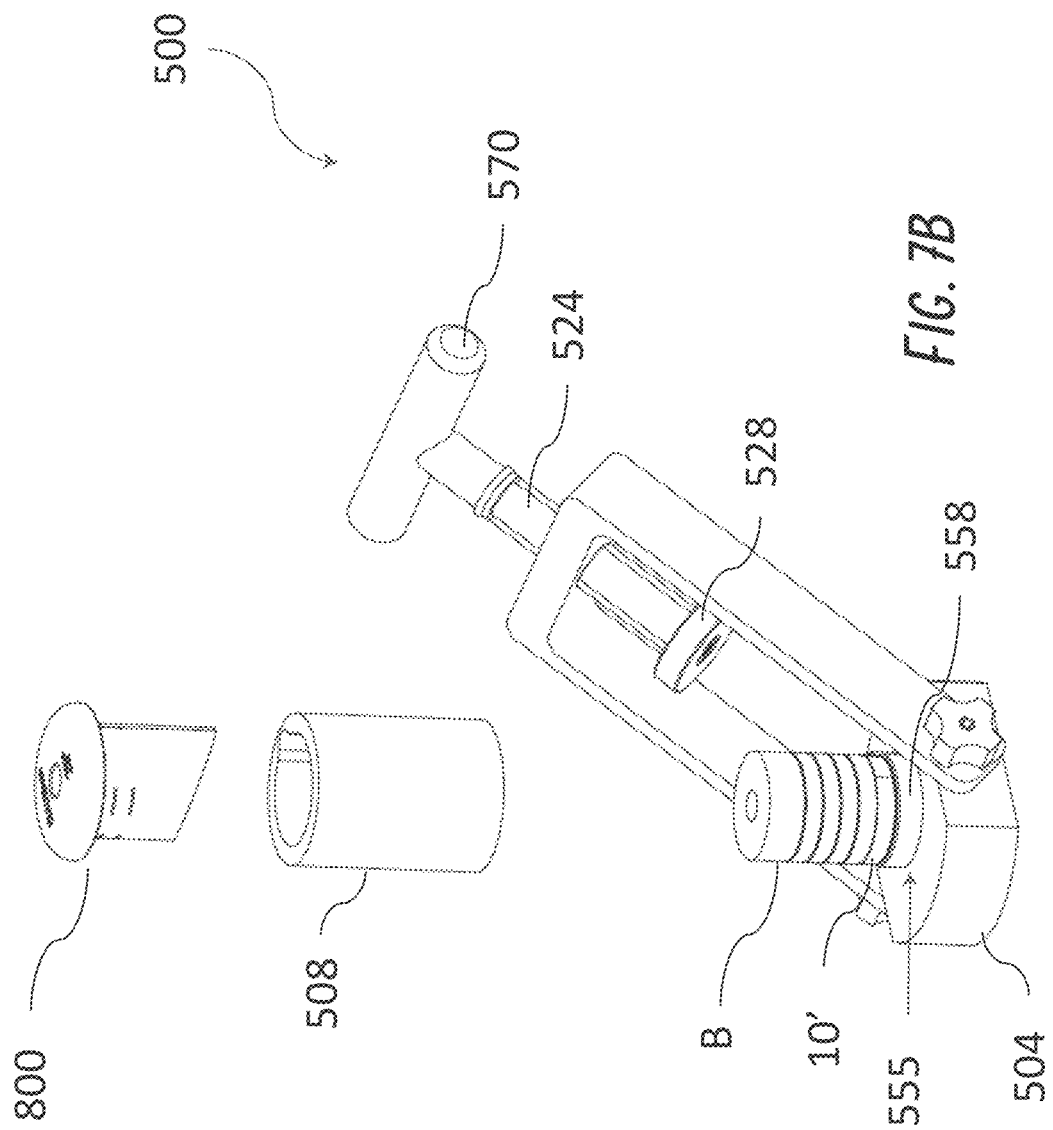
FIG. 7(B) is a partial exploded view of the bone press of FIG. 5, with the glenoid baseplate and the bone graft blank disposed on a base of the bone press.

FIG. 7(B) shows that the bone graft blank B can thereafter by placed over the component 10'. For example, the lumen $B_3$ of the bone graft blank B can be advanced over the anchor member 12'. The anchor member 12' can be received in the lumen $B_3$. The lateral surface $B_2$ of the bone graft blank B can be placed directly on the medial side of the component 10'. FIG. 7(B) shows the component 10' and the bone graft blank B on the base 504 in a zone where the pressing zone 540 will be formed. The component 10' and the bone graft blank B are disposed on the projection 558 at an elevation above the surrounding areas of the platform 555.

FIG. 7(B) shows that the housing 508 and the patient specific insert negative 800 are spaced apart from the rest of the bone press 500 at this point of one method. These components could be at the surgical table or on a back table in the operating room or could be elsewhere if the bone graft blank is formed well before the surgery.

Figure 7C:
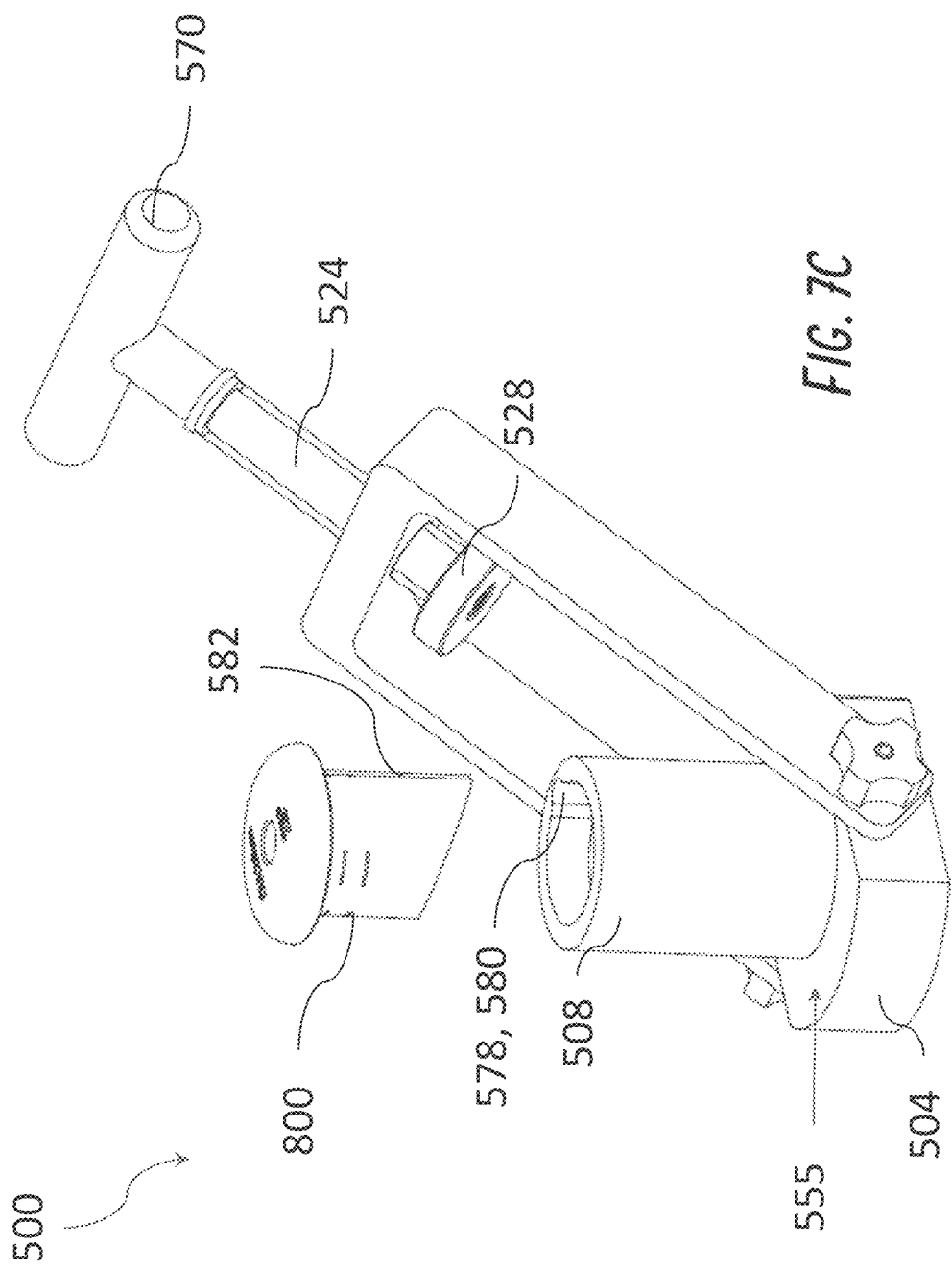
FIG. 7(C) is a partial exploded view of the bone press of FIG. 5, with a housing of the bone press disposed over and around the glenoid baseplate and the bone graft blank.

FIG. 7(C) shows a later step in which the housing 508 is advanced over the bone graft blank B. The housing 508 can be advanced over the bone graft blank B and over the component 10' if present. In the illustrated method, the housing 508 is advanced over the blank B, the component 10' and over the projection 558 into contact with a surrounding portion of the platform 555. In this position the pressing zone 540 is enclosed other than an upper portion where the patient specific insert negative 800 is to be placed.

FIG. 7(C) also shows a clocking element 578. The clocking element 578 provides pre-defined rotational position of the patient specific insert negative 800 relative to the housing 508. For some embodiments, specific orientation of the negative 800 relative to a bone press is useful for providing proper orientation or position of an augment on an asymmetrical bone graft. For example if a bone graft has an oblong, e.g., rectangular, cross section and the augment is to be provided at a specific region, e.g., along a long axis or a short axis of the bone graft, the position of the insert negative 800 relative to the housing 508 should be pre-defined to assure that the negative 800 produces the augment in the desired location. In other embodiments it is sufficient that the rotational position of the negative 800 relative to the housing 508 or the pressing zone 540 is sufficient to prevent circumferential compression which could result in shearing of the bone graft blank B. In one embodiment the housing has a cylindrical configuration with the inner periphery of the housing 508 being circular. At one or more locations of the inner periphery the periphery extends outwardly to form a longitudinal recess or channel 580 in the inner surface. The longitudinal channel 580 allows a projection 582 on the outer surface of the patient specific insert negative 800 to be received and to slide as the negative 800 is advanced in the housing 508. The channel 580 and the projection 582 engage to prevent relative rotation of the negative 800 and the housing 508 during such advancement. In another embodiment, the clocking element 578 can include channels on the patient specific insert negative 800 and projections on the housing 508. The channels or projections extends or extend from an upper surface of the housing 508 toward the lower surface thereof. The channel(s) or projection(s) can extend entirely between the upper and lower portions of the housing 508. Although the illustrated embodiment has only one channel 580, the clocking element 578 could include a plurality of channels 580 or projections if the purpose of the clocking element 578 is only for preventing rotation during movement of the patient specific insert negative 800.

Figure 7D:
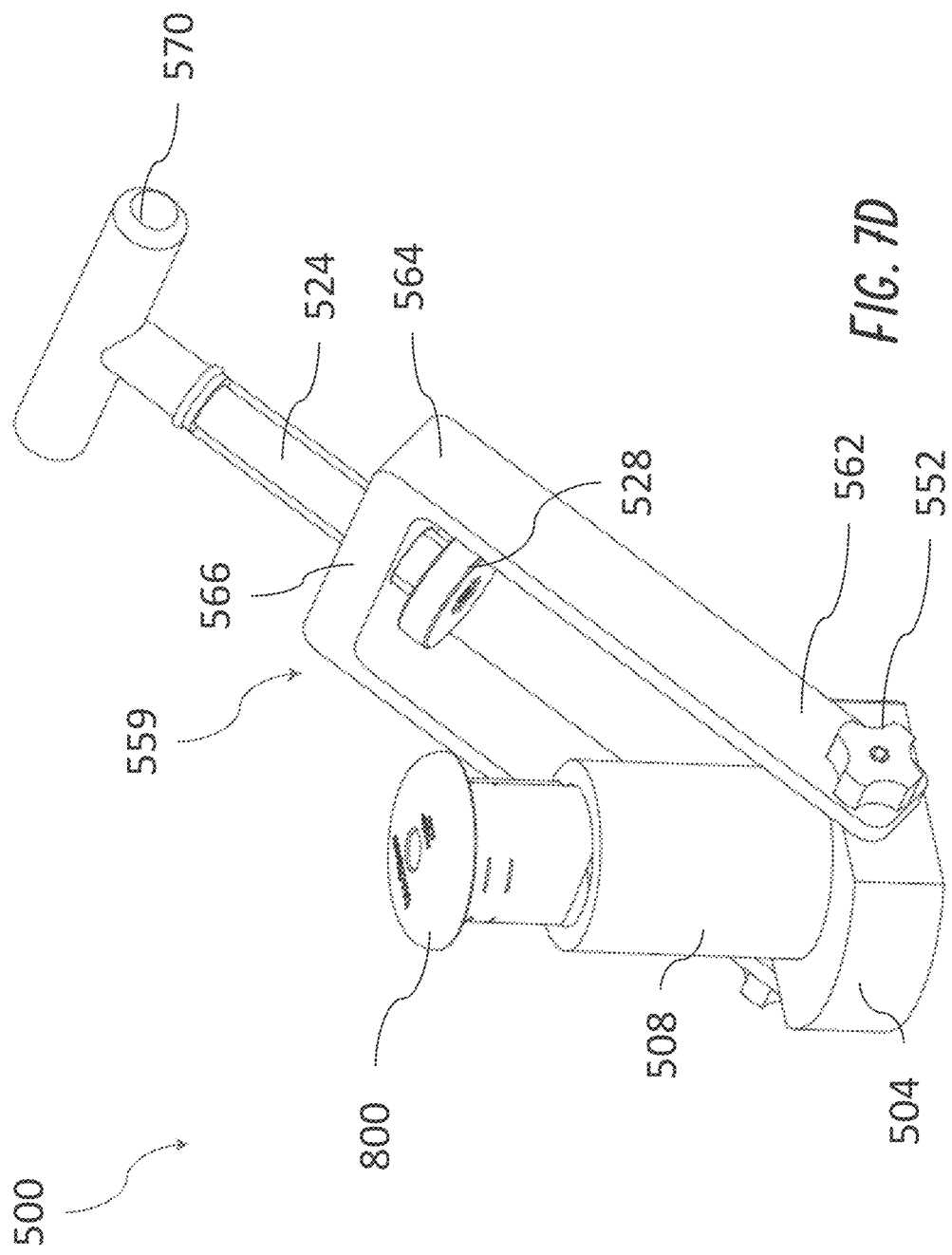
FIG. 7(D) is an assembled view of the bone press of FIG. 5, with a patient specific insert negative disposed on the bone graft blank and at least partially within a pressing zone of the bone press.

FIG. 7(D) shows the insert negative 800 placed into the housing 508. The projection 582 is received in the channel 580. This provides a specific rotational position and also prevents or limits circumferential compression.

FIG. 7(E) shows the compression plate 528 moved into contact with an upper surface 840 of the patient specific insert negative 800. After the compression plate 528 is in such contact, the handle 567 can be actuated to move the ram 524 and the compression plate 528 coupled therewith toward the base 504 to create compression of the bone graft blank B. Such compression can begin to compress the bone graft blank B. Further compression can cause the bone graft blank B to be reshaped. The reshaping of the bone graft blank can cause the medial surface of the bone graft blank B to form a shape matching the shape of the glenoid surface either as it is prior to surgery or after a prescribed amount and type of reaming. After the compression and/or reshaping the bone graft blank B is formed into a patient specific bone graft B'.

Figure 7F:
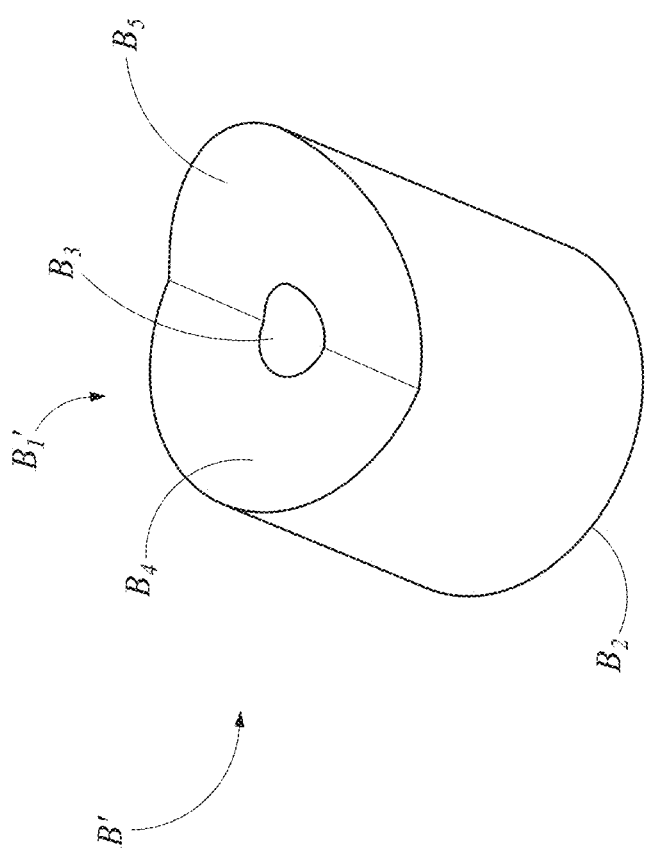
FIG. 7(F) shows a patient specific bone graft that can be formed in the bone press of FIG. 5.

FIG. 7(F) shows that in one example the patient specific bone graft B' has a first side that is or can be coupled with the prosthesis component 10' and a second side. The patient specific bone graft B' configured for the shoulder will have a contoured surface $B_1'$ that corresponds to a shape of a glenoid. The surface $B_1'$ is a patient specific bone facing portion, e.g., a portion that is configured to face glenoid of a patient. That is, the contoured surface $B_1'$ is a negative of the surface of the glenoid. The contoured surface $B_1'$ can have a first planar portion $B_4$ and a second planar portion $B_5$. The planar portions $B_4$, $B_5$ are configured to be nested in and to closely match the surfaces of the glenoid that are unaltered or that have been prepared by minimal reaming or other preparation method. The patient specific bone graft B' has a body that extends between the surface $B_1'$ and a surface $B_2$ opposite the surface $B_1'$. The body of the bone graft B' is configured to adjust the spacing of a prosthesis component coupled with the side or surface $B_2$ from a surface of the bone to which the contoured surface $B_1$ or patient specific bone facing portion is coupled. The specific bone graft B' generally is compressed, as discussed herein within any of the bone presses herein. The specific bone graft B' can be formed from a single, monolithic piece of bone or from a plurality of pieces of bone. The specific bone graft B' can comprise natural bone matter or synthetic bone matter. The specific bone graft B' can include a lumen $B_3$ therethrough configured to receive a portion of a prostheses, such as the component 10' as shown herein.

FIG. 9 shows another embodiment of a bone press 600 that can be used to compress or reshape a bone graft blank B. The bone press 600 is similar to the bone press 500 except as described differently below. The bone press 600 includes a pressing zone 604 defined within a housing 608. The housing 608 includes a first shell 612 and a second shell 616. The first shell 612 comprises at least a portion of a base 620 configured to support either directly or indirectly the advancement of the patient specific insert negative 800. In the illustrated embodiment, the first shell 612 includes a first portion of the base and the second shell 616 comprises a second portion of the base 620. In a variation the base 620 is disposed on only one of either the first shell 612 or the second shell 616.

The first shell 612 and the second shell 616 meet at an interface, which can be a planar interface. FIGS. 9 and 10 show that each of the first shell and the second shell 612, 616 comprises a portion of an access aperture 624 for receiving a shaft 692 of the impactor 690. The aperture 624 allows the impactor 690 to pass through the base 620 into the pressing zone 604 within the bone press 600.

The shells 612, 616 can each have a partially cylindrical configuration. For example a cylinder portion 628 can extend away from the portion of the base 620 formed by the shell 612 toward an end of the bone press 600 opposite the base. A cylinder portion 632 can extend away from the portion of the second shell 616 toward the opposite end. The cylinder portions 628, 632 can be half cylinders in one embodiment. The inside surfaces of the cylinder portions of the shells 612, 616 form the pressing zone 604. The outside surfaces of the cylinder portions are threaded to enable advancement of an actuator 636 as discussed below.

The shells 612, 616 can have one or more slots 640 formed therein. The slots 640 are configured to permit a mechanical connection between the actuator 636 and a compression plate 644 disposed in the pressing zone 604. In various embodiments there may be one, two, three, four, five, six, or more slots 640. In the illustrated embodiment, there are four slots 640. Each of the shells 612, 616 has one slot 640 formed entirely therein. A slot 640 is formed on each side of the bone press along the interface between the shells 612, 616.

The compression plate 644 includes a central portion 652 that can be disposed inside the pressing zone 604 of the bone press 600 and force transfer projection 656 extending peripherally from the central portion 652. The compression plate has a force transfer projection 656 for at least one of the slots 640. The compression plate 644 can have one force transfer projection 656 for each of the slots 640, as illustrated in the FIG. 11(C). By disposing the force transfer projections 656 through the slots 640 the force transfer projections can be engaged by the actuator 636 as discussed below. The projections 656 can comprise an enlarged lobe disposed outside the slot 640 and a narrow portion between the lobe and the central portion 652.

The actuator 636 comprises a cylindrical portion 664 at a first end 668 that includes a threaded interior 670. The first end has a distal face 671 that acts on the compression plate 644. The interior threads are configured to engage the exterior threads disposed along the shells 612, 616. The threads on the shells 612, 616 and on the interior 670 enable advancement of the actuator 636 along the shells. The advancement of the actuator 636 engage the compression plate 644 to push the compression plate into the bone graft blank B to compress and/or re-shape the bone graft blank. The actuator 636 has an enlarged hand grip 672. The hand grip 672 can include one or more enlarged members that the hand grip 672 can engage. The hand grip 672 can help increase the torque by extending farther than does the cylindrical portion 664 away from an axis of rotation of the actuator 636 about the shells 612, 616.

FIGS. 11(A)-11(E) illustrate the use of the bone press 600. The impactor 690 has a first end with a handle 678 and a second end with engagement features 680 to connect the impactor 690 with the component 10'. FIG. 11(B) shows that the user can therefore connect the lateral side of the component 10' to the engagement features 680 of the impactor 690. Thereafter the bone graft blank B can be coupled with the component 10'. For example, thereafter lumen $B_3$ of the bone graft blank B can be placed over the anchor member 12'. The anchor member 12' can be inserted into the lumen $B_3$ from the lateral side $B_2$ of the bone graft blank B until the lateral side of the bone graft blank B engaged the medial side of the component 10'.

FIG. 11(C) shows that after the component 10' and the bone graft blank B are coupled with the impactor 690 these components can be coupled with the bone press. For instance, the shaft 692 of the impactor 690 can be laid in a lower portion of the access aperture 624. When so placed, the component 10' and the bone graft blank B are disposed in the inside portion of the first shell 612. The lateral side of the portion of the impactor 690 carrying the engagement features 680 (see FIG. 11(A)) can be placed in the first shell 612 such that the lateral side of the impactor is in direct contact with the base 620. Thereafter the patient specific insert negative 800 and the compression plate 644 are placed in the pressing zone 604, e.g., into the interior surface of the first shell 612. Specifically, the keyed projection 844 on the second side 806 of the negative can be received in a corresponding slot 657 of the compression plate 644. In one technique the keyed projection 844 is received in the slot 657 and thereafter the slot 657 and the plate 644 are placed in the first shell 612 such that the contoured surface 808 of the insert negative 800 faces the bone graft blank B and such that the bone graft blank B is between the base 620 and the compression plate 644. FIG. 11(D) shows the foregoing arrangement.

Following placement as in FIG. 11(D), a block 682 coupled with the second shell 616 is placed over a bottom portion of the base 620. The block 682 can be manipulated by a handle 684 coupled with the block 682. The block 682 can be coupled with a bottom portion of the base 620 in a suitable fashion. For example, a plurality of projections 686 disposed on the lower side of the block 682 can be received in a corresponding plurality of apertures 688 formed on the lower side of the base 620. The illustrated embodiment shows that three projections 686 can be received in three corresponding apertures 688 shown in the illustrated embodiment.

FIG. 11(E) shows the second shell 616 coupled with the first shell 612. Thereafter the actuator 636 can be threaded onto the free end of the shells 612, 616. The threading of the actuator onto the shells 612, 616 is facilitated by the hand grip 672. Further threading, as indicated by arrow A (see FIG. 10), causes the projections 656 of the compression plate 644 to be engaged by the distal face 671 of the actuator 636 opposite the hand grip 672. Further threading causes the actuator 636 to engage the projections 656 moving the compression plate 644 toward the bone graft blank B. After compression has begun further advancement of the actuator 636 can cause the bone graft blank B to be reshaped such that the bone graft blank can be re-formed from a generic shape to a shape specifically configured for a particular patient, as discussed above.

FIG. 5-7(E) illustrate that the bone press 500 provides the benefit of high compression capability due to the threaded connection between the ram 534 with the benefit of compressing and/or reshaping the bone graft blank B into the patient specific bone graft right on the component 10'. By forming the bone graft on the component 10', the surgeon or another user can avoid transferring bone graft to the component 10' which would require an additional step and/or could result in damage to the bone graft.

FIG. 9-11(E) illustrate that the bone press 600 provides the benefit of high compression capability due to the threaded connection between the actuator 636 and the shells 612, 616 with the benefit of having, pre-loaded onto the impactor 690, the component 10' and the formed patient specific bone graft formed from the bone graft blank B in the bone press 600. As a result, the surgeon is not required to load the bone graft and the component 10' onto the impactor 690. By forming the bone graft and the component 10' preloaded on the impactor the surgeon or another medical professional can avoid transferring the bone graft and the component 10' to the impactor 690 which would require an additional step and/or could result in the bone graft being displaced on or from the component 10'.

FIGS. 12-14(B) show another bone press 700 that can be used to form a patient specific bone graft from a bone graft blank B. The bone press 700 provides a number of advantages, including forming the bone graft on the impactor 690 and enabling formation of the bone graft through a single pre-defined motion among other advantages.

The bone press 700 includes a compression plate 702, a base 704, a housing 708, and an actuator 712. The compression plate 702 comprises a rigid plate-like configuration. The compression plate 702 has a first side 720 with a platform 722 and a second side 724 opposite the first side 720. The compression plate 702 has lateral sides 728 to which the actuator 712 is coupled. The actuator 712 is coupled to the compression plate 702 at the lateral sides 728 by a plurality of pins 730, but threaded members or other connection devices could be used. The first side 720 includes a keyed interface that can include a linear protrusion 732 that retains the patient specific insert negative 800 in a pre-defined rotational position relative to the bone graft blank B. The keyed interface also can include a peg 733 projecting away from the first side 720 of the compression plate 702 and away from the linear protrusion 732 toward the base 704. The patient specific insert negative 800 has a corresponding groove or slot 734. The slot 734 is sized to receive the protrusion 732 of the interface. If provided, the peg 733 is received in an aperture, recess or a lumen 850 of the patient specific insert negative 800 (See FIG. 13). Other couplings could be provided between the patient specific insert negative 800 and the compression plate 702. For example, a plurality of pegs could be provided projecting from the first side 720 to mate in only one orientation with the patient specific insert negative 800. The pegs could be on the patient specific insert negative 800, to mate with apertures in the compression plate 702. The interface 732 could be on the patient specific insert negative 800 to mate with the groove or slot 734 formed on the compression plate 702. Other variations are also possible.

The base 704 has a first side 742 and a second side 744. The base 704 is disposed opposite the compression plate 702 in the bone press 700. The second side 744 faces the compression plate 702. The housing 708 extends between the base and the compression plate. The housing 708 has a first end 746 that contacts the compression plate 702 and a second end 748 that contact the base 704. A pressing zone 750 is formed between the patient specific insert negative 800 (mounted on the compression plate 702), the base 704, and the housing 708. As discussed herein, the pressing zone 750 is a place where compression of the bone graft blank B can occur. The base 704 also includes an access path 754 for receiving the impactor 690. The access path 754 preferably extends from one of the sides of the base 704, e.g., from a top side of the base 704. The access path can comprise a U-shaped recess formed form the top side of the base to a central portion of the base, e.g., to a position aligned with a central longitudinal axis of the pressing zone 750.

The actuator 712 comprises a pair of bars 762 disposed on opposite sides of the pressing zone 750. The bars 762 are pivotably coupled with the base 704. Pins 764 extend through the bars 762 and into the base. The pins 764 permit the bars to rotate from an upright position, shown in FIG. 12, to inclined position, one of which is shown in FIG. 13. The bars 760 are also rigidly connected by a transverse bar 768. The bars 760 are also connected by a force transfer rod 769. Movement between the pins 764 and the bars 762 is limited to rotation in some embodiments. The force transfer rod 769 is able to pivot relative to the bars 760 and also can slide along slots 770 formed in the bars. The slots 770 are formed in each bar 760, are parallel to each other, and have the same length in some embodiments. FIGS. 12-14(B) all show the force transfer rod 769 at an end of the slot corresponding to a state of compression. The force transfer rod 769 can move toward or to the opposite end of the slot 770, which corresponds to a more open configuration of the bone press 700. In one embodiment, the slots 770 are eliminated and the bars 760 can be pivotably coupled with a force transfer member such without any movement of the force transfer member relative to the bars 760. The actuator 712 also includes a handle 772 that can be grasped by a user in order to move the actuator 712 between an upright position, as in FIG. 12 and an inclined position as in FIG. 13. The upright position is one in which compression can occur in the pressing zone 750. The inclined position is one in which compression is reduced or eliminated compared to the upright position. In some inclined position the pressing zone 750 can be opened and accessed to load the component 10' and/or the bone graft blank B.

Figure 14A:
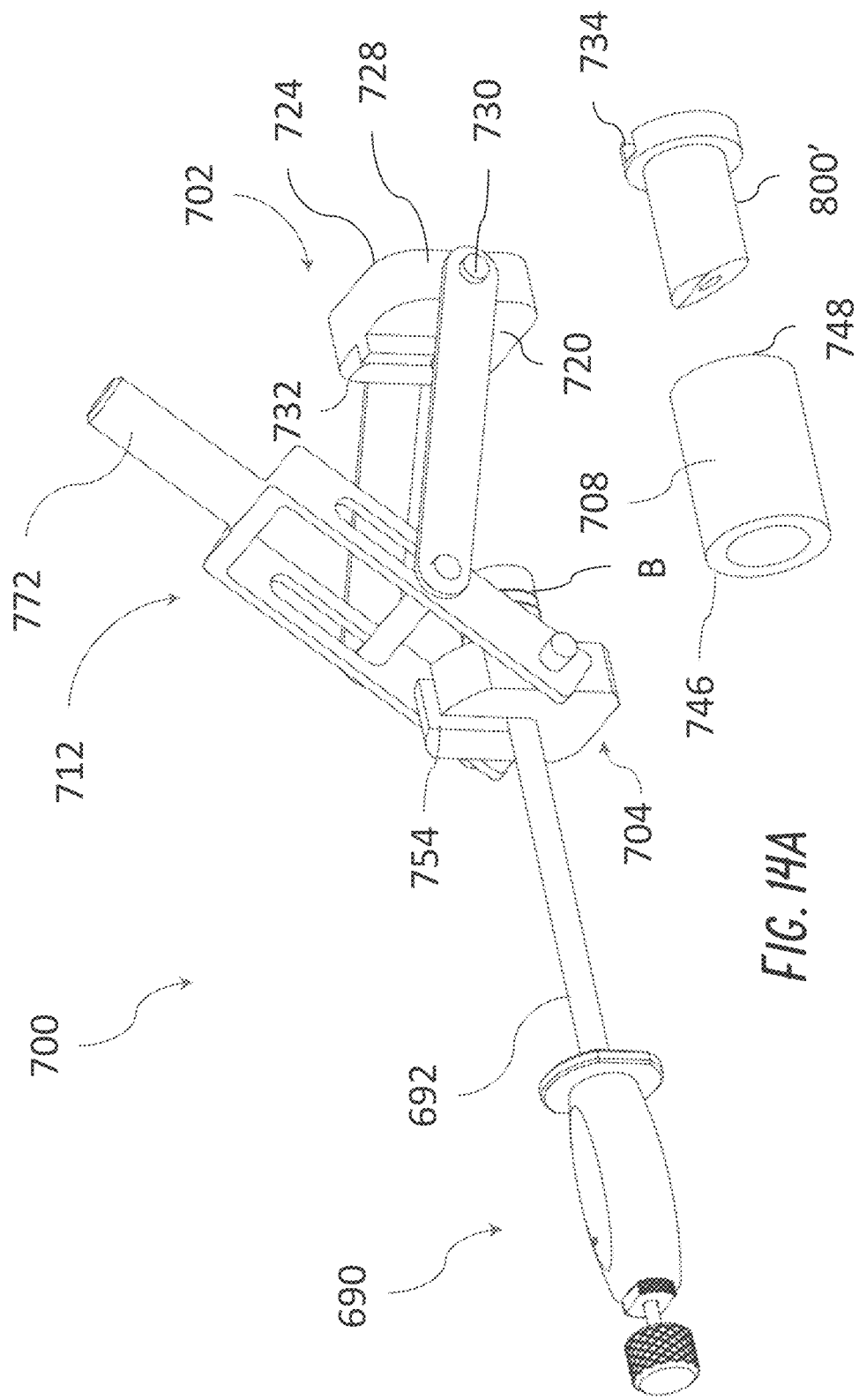
FIG. 14(A) is a partial exploded view of the bone press of FIG. 12 with an impactor, a joint prosthesis component, and a bone graft blank received in and on a base thereof.
Figure 14B:
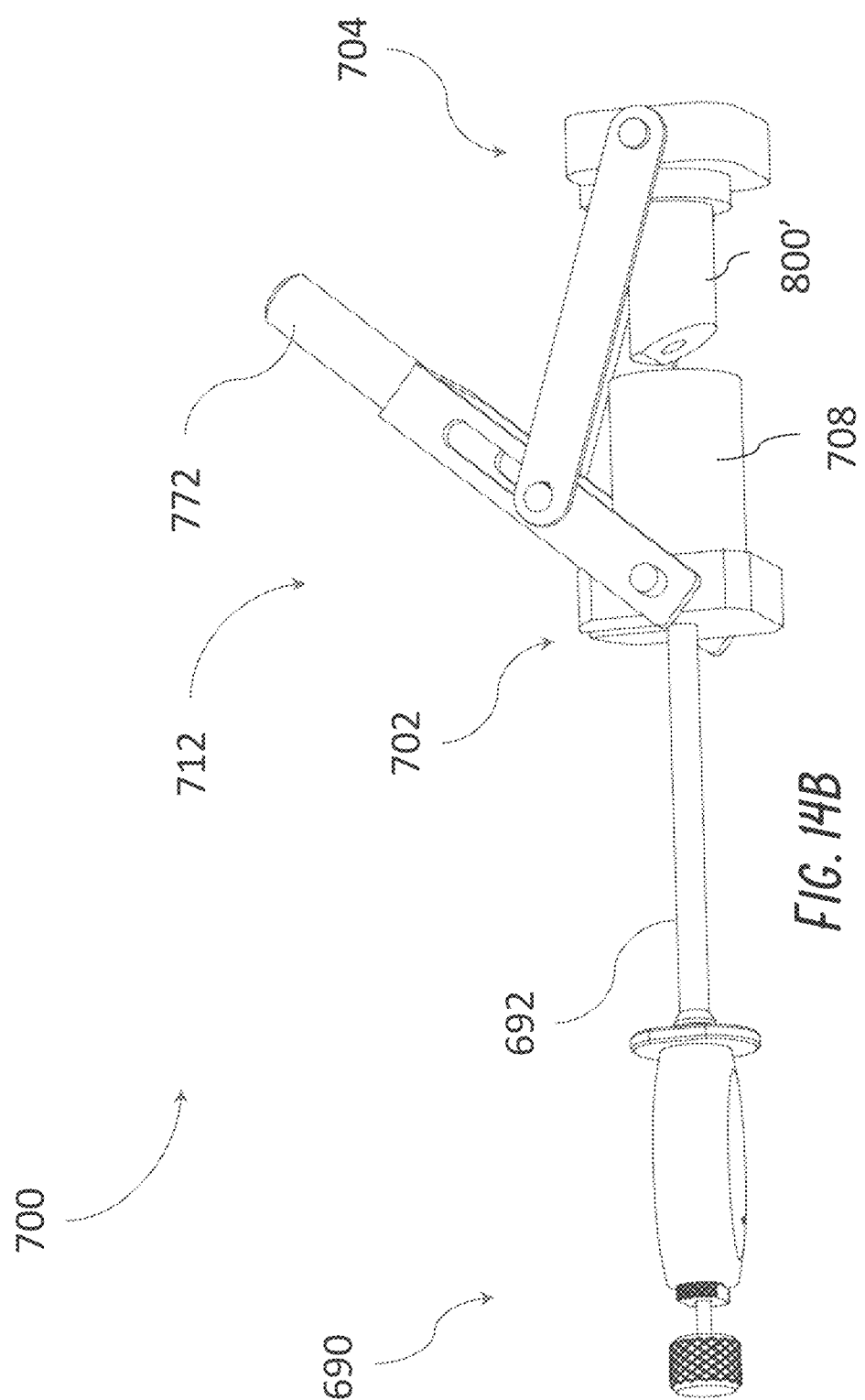
FIG. 14(B) is an assembled view prior to actuation of a lever to apply compression in the pressing zone, with a housing disposed around the bone graft blank and the patient specific insert negative coupled with a compression plate.

FIGS. 14(A)-14(B) show how the bone press 700 can be used. In the illustrated embodiment, the bone press 700 is configured to compress and reshape a bone graft blank B mounted on the impactor 690. Prior to compressing the bone graft blank B, the actuator 712 is placed in an inclined position, as shown in FIG. 13-14B. FIG. 13 shows that bone press 700 can receive the component 10' as well as the blank B. Accordingly, in one variation of the bone press 700 the component 10' and the bone graft blank B can be mounted to the impactor 690 as shown in FIGS. 11(A)-11(B). The combination of the impactor 690, the component 10' and the bone graft blank B can be coupled with the base 704. In one embodiment, the shaft 692 is inserted into the access path 754. Thereafter, the component 10' can be mounted to engagement features 680 of the impactor 690 at a location between the base 704 and the compression plate 702. A bone graft blank B is then advanced over the anchor member 12'.

The pressing zone 750 then can be formed by placing the housing 708 over the bone graft blank B. The insert negative 800 can be mounted to the peg 733. The pressing zone 750 can be enclosed by placing the patient specific insert negative 800 into the housing 708 as shown in FIG. 13.

After the pressing zone 750 is enclosed, the actuator can be moved from an inclined position, as in FIGS. 13-14(B), toward an upright position as shown in FIG. 12. FIG. 13 shows a gap between the patient specific insert negative 800 and the medial side $B_1$ of the bone graft blank B. A first movement of the actuator 712 from the inclined position of FIG. 13 toward the upright position of FIG. 12 the gap is closed and contact between the patient specific insert negative 800 and the medial side $B_1$ of the bone graft blank B. Further movement causes compression of the bone graft blank B. After compression of the bone graft blank B, further movement of the actuator 712 reshapes the bone graft blank B. The reshaping can be such that the bone graft blank B is formed into a patient specific bone graft.

The bone press 700 provides the advantage of transforming the bone graft blank B into a patient specific bone graft without requiring a repeating motion, such as threading one member relative to another. Rather, the transformation can result from a single motion from an inclined configuration (as in FIGS. 13-14(B) or more inclined) to an upright position as in FIG. 12. The arrangement of the bars 760, 762 also can be arranged to create a great deal of compression in the pressing zone 750. The amount of compression can be tailored by the location of the force transfer member 769 and the handle 772.

Terminology

Although certain embodiments have been described herein with respect to an anatomic component or a reverse component, the implants and methods described herein can interchangeably use any articular component, including the anatomic and reverse components described herein, as the context may dictate.

As used herein, the relative terms "proximal" and "distal" shall be defined from the perspective of the implant. Thus, proximal refers to the direction of the articular component and distal refers to the direction of the base plate when the implant is assembled.

Note that the terms "first" and "second" articular components can be used interchangeably and to refer to the anatomic components or the reverse components. Accordingly, the "first" and "second" openings can be used interchangeably and to refer to any one of the openings in the baseplate.

Conditional language, such as "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

The terms "approximately," "about," and "substantially" as used herein represent an amount close to the stated amount that still performs a desired function or achieves a desired result. For example, the terms "approximately," "about," and "substantially" may refer to an amount that is within less than 10% of the stated amount, as the context may dictate. As an example, in certain embodiments, the term "generally perpendicular" refers to a value, amount, or characteristic that departs from exactly perpendicular by less than about 10 degrees.

Although certain embodiments and examples have been described herein, it will be understood by those skilled in the art that many aspects of the glenoid implants shown and described in the present disclosure may be differently combined and/or modified to form still further embodiments or acceptable examples. All such modifications and variations are intended to be included herein within the scope of this disclosure. A wide variety of designs and approaches are possible. No feature, structure, or step disclosed herein is essential or indispensable.

Some embodiments have been described in connection with the accompanying drawings. However, it should be understood that the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

For purposes of this disclosure, certain aspects, advantages, and novel features are described herein. It is to be understood that not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to the examples described in the present specification or during the prosecution of the application, which examples are to be construed as non-exclusive. Further, the actions of the disclosed processes and methods may be modified in any manner, including by reordering actions and/or inserting additional actions and/or deleting actions. It is intended, therefore, that the specification and examples be considered as illustrative only, with a true scope and spirit being indicated by the claims and their full scope of equivalents.

Any methods disclosed herein need not be performed in the order recited. The methods disclosed herein include certain actions taken by a practitioner; however, they can also include any third-party instruction of those actions, either expressly or by implication. For example, actions such as "inserting a base plate into a glenoid cavity" include "instructing insertion of a base plate into a glenoid cavity."

What is claimed is:

1. A bone press, comprising:
   a base sized and configured to receive a platform having a central post and at least two peripheral posts projecting upwardly from the base in radially spaced relation to the central post, configured to couple to a component supporting a bone graft blank;
   a compression plate located opposite to the base;
   a cylindrical housing that extends between the base and the compression plate, the cylindrical housing extending along a longitudinal axis of the bone press and configured to be advanced over the platform and come into contact with an upper surface of the base at a location outward of the platform and to retain the bone graft blank while being compressed to define a cylindrical bone graft;
   a pressing zone within the cylindrical housing and between the base and the compression plate along the longitudinal axis of the bone press;
   an actuator including:
      a frame including two bars pivotally connected at a first end to the base and each bar including an elongate rigid portion extending from the first end to a transverse bar linking the two bars at a second end;
      a threaded ram connected through the transverse bar to the compression plate configured to provide relative movement between the compression plate and the base to create compression in the pressing zone wherein the at least two peripheral posts coupled to the component are configured to prevent torque induced in the pressing zone during compression thereby preventing rotation of the component and the bone graft blank while the actuator is being rotated; and
      a handle connected to the threaded ram at an end opposite to the compression plate configured to provide relative movement of the compression plate by rotation; and
   a patient specific insert negative configured to be inserted into the pressing zone.

2. The bone press of claim 1, wherein the compression plate is coupled with the frame of the bone press by a threaded connection.

3. The bone press of claim 2, wherein the threaded ram includes external threads coupled with internal threads of the frame and the relative movement of the compression plate is configured to be provided by manually rotating the handle.

4. The bone press of claim 2, wherein the pressing zone is defined between two opposing shells, the two opposing shells being separable at an interface and having external threads defined on an outside surface thereof, the actuator including a cylindrical portion that includes internal threads to engage the external threads of the two opposing shells and a distal surface to engage the compression plate.

5. The bone press of claim 1, wherein the patient specific insert negative includes a scale indicative of a degree of compression of a bone graft blank upon actuation of the actuator.

6. The bone press of claim 1, wherein a first side of the patient specific insert negative comprises a contoured surface configured to correspond to a patient specific joint surface.

7. The bone press of claim 6, wherein a second side of the patient specific insert comprises a projection to rotationally fix the patient specific insert negative within the pressing zone.

8. The bone press of claim 1, further comprising a keyed interface that reduces transmission of circumferential compression in the pressing zone.

9. The bone press of claim 8, wherein the keyed interface includes a recess defined on a surface of the compression plate facing the base.

10. The bone press of claim 8, wherein the keyed interface includes a longitudinal recess defined in the cylindrical housing.

11. The bone press of claim 1, wherein the compression plate is coupled with the frame moveable away from the base to provide access to the base.

12. The bone press of claim 1, wherein the base includes the platform to couple with a joint prosthesis component.

13. The bone press of claim 12, wherein the platform includes a plurality of projections that extend into apertures of a baseplate of a glenoid component.

14. The bone press of claim 1, wherein the base includes an access aperture that permit a shaft of an impactor to pass therethrough such that a distal portion of the impactor can be located in the pressing zone.

15. The bone press of claim 1, wherein the component is a glenoid component for implanting into a scapula.

* * * * *